United States Patent
Baby

(10) Patent No.: US 10,360,269 B2
(45) Date of Patent: Jul. 23, 2019

(54) PROXY DATABASES

(71) Applicant: Oracle International Corporation, Redwood Shores, CA (US)

(72) Inventor: Thomas Baby, Auburn, WA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 186 days.

(21) Appl. No.: 15/331,657

(22) Filed: Oct. 21, 2016

(65) Prior Publication Data

US 2017/0116335 A1 Apr. 27, 2017

Related U.S. Application Data

(60) Provisional application No. 62/245,937, filed on Oct. 23, 2015, provisional application No. 62/395,267, filed on Sep. 15, 2016.

(51) Int. Cl.
  *G06F 17/30* (2006.01)
  *G06F 16/951* (2019.01)
  (Continued)

(52) U.S. Cl.
  CPC .............. *G06F 16/951* (2019.01); *G06F 8/65* (2013.01); *G06F 16/21* (2019.01); *G06F 16/252* (2019.01); *G06F 16/27* (2019.01); *H04L 67/2814* (2013.01)

(58) Field of Classification Search
  CPC .................................................... G06F 17/30
  See application file for complete search history.

(56) References Cited

U.S. PATENT DOCUMENTS 6,185,699 B1   2/2001   Haderle
6,205,449 B1   3/2001   Rastogi
(Continued)

FOREIGN PATENT DOCUMENTS

WO   WO 2006/045844 A1   5/2006
WO   WO 2014/052851      4/2014
(Continued)

OTHER PUBLICATIONS

Rajeev Kumar et al., "Oracle DBA, A Helping Hand," Container Database and Pluggable Database (CDB & PDB), retrieved from the internet on Dec. 4, 2013, 2 pages.
(Continued)

*Primary Examiner* — Khanh B Pham
(74) *Attorney, Agent, or Firm* — Hickman Palermo Becker Bingham LLP

(57) ABSTRACT

In an approach, when a pluggable database within a container database is transported to a new container database, the pluggable database is replaced with a proxy pluggable database storing forwarding information for the pluggable database. When a command is received that is to be executed on the proxy pluggable database, the database server handling the command uses the forwarding information stored within the proxy pluggable database to forward the command to a second database receiver responsible for the new container database for execution on the pluggable database. The result of executing the command is then returned to the first database server. Thus, application code which references the pluggable database within the original container database does not have to be rewritten to reference the new location and can remain agnostic as to the actual location of the pluggable database.

20 Claims, 13 Drawing Sheets

(51) Int. Cl.
  *G06F 8/65*     (2018.01)
  *H04L 29/08*    (2006.01)
  *G06F 16/27*    (2019.01)
  *G06F 16/21*    (2019.01)
  *G06F 16/25*    (2019.01)

(56) References Cited

U.S. PATENT DOCUMENTS

| | | |
|---|---|---|
| 6,226,650 B1 | 5/2001 | Mahajan |
| 6,295,610 B1 | 9/2001 | Ganesh |
| 6,804,671 B1 | 10/2004 | Loaiza et al. |
| 7,305,421 B2 | 12/2007 | Cha |
| 7,822,717 B2 | 10/2010 | Kappor et al. |
| 8,117,174 B2 | 2/2012 | Shaughessey |
| 8,364,648 B1 | 1/2013 | Sim-Tang |
| 8,478,718 B1 | 7/2013 | Ranade |
| 9,026,679 B1 | 5/2015 | Shmuylovich |
| 9,122,644 B2 | 9/2015 | Kruglikov et al. |
| 2002/0112022 A1 | 8/2002 | Kazar et al. |
| 2002/0143733 A1 | 10/2002 | Mukkamalla |
| 2003/0061537 A1 | 3/2003 | Cha et al. |
| 2004/0039962 A1 | 2/2004 | Ganesh |
| 2004/0054643 A1 | 3/2004 | Vermuri |
| 2004/0054644 A1 | 3/2004 | Ganesh |
| 2004/0177099 A1 | 9/2004 | Ganesh |
| 2004/0210577 A1 | 10/2004 | Kundu |
| 2004/0267809 A1 | 12/2004 | East et al. |
| 2005/0033818 A1* | 2/2005 | Jardin ............... G06F 17/30545 709/213 |
| 2005/0038831 A1 | 2/2005 | Souder et al. |
| 2005/0149552 A1 | 7/2005 | Chan et al. |
| 2005/0278276 A1 | 12/2005 | Andreev et al. |
| 2006/0041574 A1 | 2/2006 | Cunningham |
| 2006/0047713 A1 | 3/2006 | Gornshtein |
| 2006/0074937 A1* | 4/2006 | Bird ............... G06F 7/00 |
| 2007/0100912 A1 | 5/2007 | Pareek et al. |
| 2007/0244918 A1 | 10/2007 | Lee et al. |
| 2009/0089332 A1 | 4/2009 | Harger |
| 2010/0185645 A1 | 7/2010 | Pazdziora |
| 2010/0318570 A1 | 12/2010 | Narasinghanallur et al. |
| 2011/0004586 A1 | 1/2011 | Cherryholmes et al. |
| 2011/0060724 A1 | 3/2011 | Chan |
| 2011/0087633 A1 | 4/2011 | Kreuder et al. |
| 2011/0307450 A1 | 12/2011 | Hahn et al. |
| 2012/0109926 A1 | 5/2012 | Novik et al. |
| 2012/0284228 A1 | 11/2012 | Ghosh |
| 2012/0287282 A1 | 11/2012 | Lu |
| 2012/0323849 A1 | 12/2012 | Garin |
| 2013/0080474 A1 | 3/2013 | Zhang |
| 2013/0085742 A1 | 4/2013 | Barker et al. |
| 2013/0117237 A1 | 5/2013 | Thomsen et al. |
| 2013/0198133 A1 | 8/2013 | Lee |
| 2013/0212068 A1 | 8/2013 | Talius et al. |
| 2013/0275550 A1* | 10/2013 | Lee ............... G06F 17/30545 709/217 |
| 2014/0032525 A1 | 1/2014 | Merriman et al. |
| 2014/0095452 A1 | 4/2014 | Lee et al. |
| 2014/0095530 A1* | 4/2014 | Lee ............... G06F 11/1471 707/769 |
| 2014/0095546 A1 | 4/2014 | Kruglikov et al. |
| 2014/0164331 A1 | 6/2014 | Li |
| 2015/0032694 A1 | 1/2015 | Rajamani et al. |
| 2015/0120659 A1 | 4/2015 | Srivastava |
| 2015/0254240 A1 | 9/2015 | Li et al. |
| 2016/0170978 A1* | 6/2016 | Michael ............... G06F 17/303 707/609 |
| 2017/0116278 A1 | 4/2017 | Baby et al. |
| 2017/0116282 A1 | 4/2017 | Jain |
| 2017/0116321 A1 | 4/2017 | Jain et al. |
| 2017/0116334 A1 | 4/2017 | Kruglikov et al. |
| 2018/0075044 A1 | 3/2018 | Kruglikov |
| 2018/0075086 A1 | 3/2018 | Yam |

FOREIGN PATENT DOCUMENTS

| | | |
|---|---|---|
| WO | WO 2014/052851 A1 | 4/2014 |
| WO | WO2014/052851 A1 | 4/2014 |
| WO | WO 2014/145230 A1 | 9/2014 |

OTHER PUBLICATIONS

Preimesberger, Chris, "Oracle Profits Up, but Revenues Slip" Oracle, dated Sep. 20, 2012, 2 pages.

Oracle Base, Multitenant: Create and Configure a Pluggable Database (PDB) in Oracle Database 12c Release 1 (12.1), dated Jan. 8, 2014, 16 pages.

Muhammad Anwar, "How to Install Oracle 12c Multitenant Pluggable Database", Dated Feb. 24, 2012, 27 pages.

Garcia-Molina et al., "Database System Implementation", dated Jan. 1, 2000, 84 pages.

Francisco Munoz et al., "Oracle Database 12c Backup and Recovery Survival Guide", dated Sep. 24, 2013, 8 pages.

Dominic Betts et al., "Developing Multi-Tenant Applications for the Cloud," 3rd Edition, Microsoft, 2012, 246 pages.

Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.

Anonymous: "Oracle-Base—Multitenant: Overview of Container Databases (CDB) and Pluggable Databases (PDB)", dated Mar. 3, 2014, 4 pages.

Anonymous, :An Oracle White Paper Oracle Database Appliance: Migration Strategies, dated Jun. 2012, 14 pages.

Kruglikov, U.S. Appl. No. 15/266,902, filed Sep. 15, 2016, Office Action, dated Aug. 6, 2018.

Jain, U.S. Appl. No. 15/192,837, filed Jun. 24, 2016, Office Action, dated Sep. 21, 2018.

Yam, U.S. Appl. No. 15/266,917, filed Sep. 15, 2016, Interview Summary, dated Oct. 19, 2018.

Kruglikov, U.S. Appl. No. 15/266,902, filed Sep. 15, 2016, Interview Summary dated Oct. 1, 2018.

Yam, U.S. Appl. No. 15/266,917, Filed Sep. 15, 2016, Final Office Action dated, Feb. 4, 2019.

Krugikov, U.S. Appl. No. 15/266,902, Filed Sep. 15, 2016, Interview Summary dated, Feb. 20, 2019.

Krugikov, U.S. Appl. No. 15/266,902, Filed Sep. 15, 2016, Final Office Action dated, Jan. 31, 2019.

* cited by examiner

PROXY DATABASES

PRIORITY CLAIMS AND RELATED APPLICATIONS

This application claims the benefit of U.S. Provisional Application No. 62/245,937, filed Oct. 23, 2015 and U.S. Provisional Application No. 62/395,267, filed Sep. 15, 2016; the entire contents of the aforementioned applications is hereby incorporated by reference for all purposes as if fully set forth herein.

FIELD OF THE INVENTION

The present invention generally relates to techniques for establishing a proxy database that resides within a container database and forwards commands to a pluggable database residing within a different container database. The present invention also relates to techniques for container maps which allow logical partitioning of data across pluggable databases. The present invention further relates to query optimization techniques which minimize the amount of data that is transferred between a query coordinator process and its slave processes as well as between different remote container databases.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.
Database Systems A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.
Multitenant Architecture A container is a collection of schemas, objects, and related structures in a multitenant container database (CDB) that appears logically to an application as a separate database. Within a CDB, each container has a unique ID and name. The root database and every pluggable database (PDB) is considered a container. PDBs isolate data and operations so that from the perspective of a user or application, each PDB appears as if it were a traditional non-CDB. Each PDB is defined by its own separate database dictionary. A database dictionary comprises metadata that defines database objects contained in a database. In effect, a database dictionary defines the totality of a database. Database objects include tables, table columns, and tablespaces. A tablespace is a set of one or more files that are used to store the data for various types of database objects, such as tables. If data for a database object is stored in a tablespace, a database dictionary maps a database object to one or more tablespaces that hold the data for that database object.

The root container, also called "the root", is a collection of schemas, schema objects, and nonschema objects to which all PDBs within a particular CDB belong. Every CDB has one root which stores the system metadata required to manage all PDBs within the CDB. In some implementations, the root does not store "user" data but instead stores data that is common across the PDBs of the CDB, such as definitions for common users and roles, shared tables, code packages, and so forth. A PDB is a user-created set of schemas, objects, and related structures that appears logically to an application as a separate database. As a result, each PDB can potentially be used to store data related to a different application, such as one PDB being dedicated to hosting a human resources application and another PDB being dedicated to hosting a sales application. However, since shared resources are stored just once in the root database and linked to by the database dictionaries of the PDBs, duplication of data is avoided compared to hosting each application with a completely separate traditional database. Furthermore, since PDBs are essentially self-contained databases in their own right, PDBs can be easily transferred between different CDBs for upgrade or load balancing purposes.

DETAILED DESCRIPTION

Figure 1:
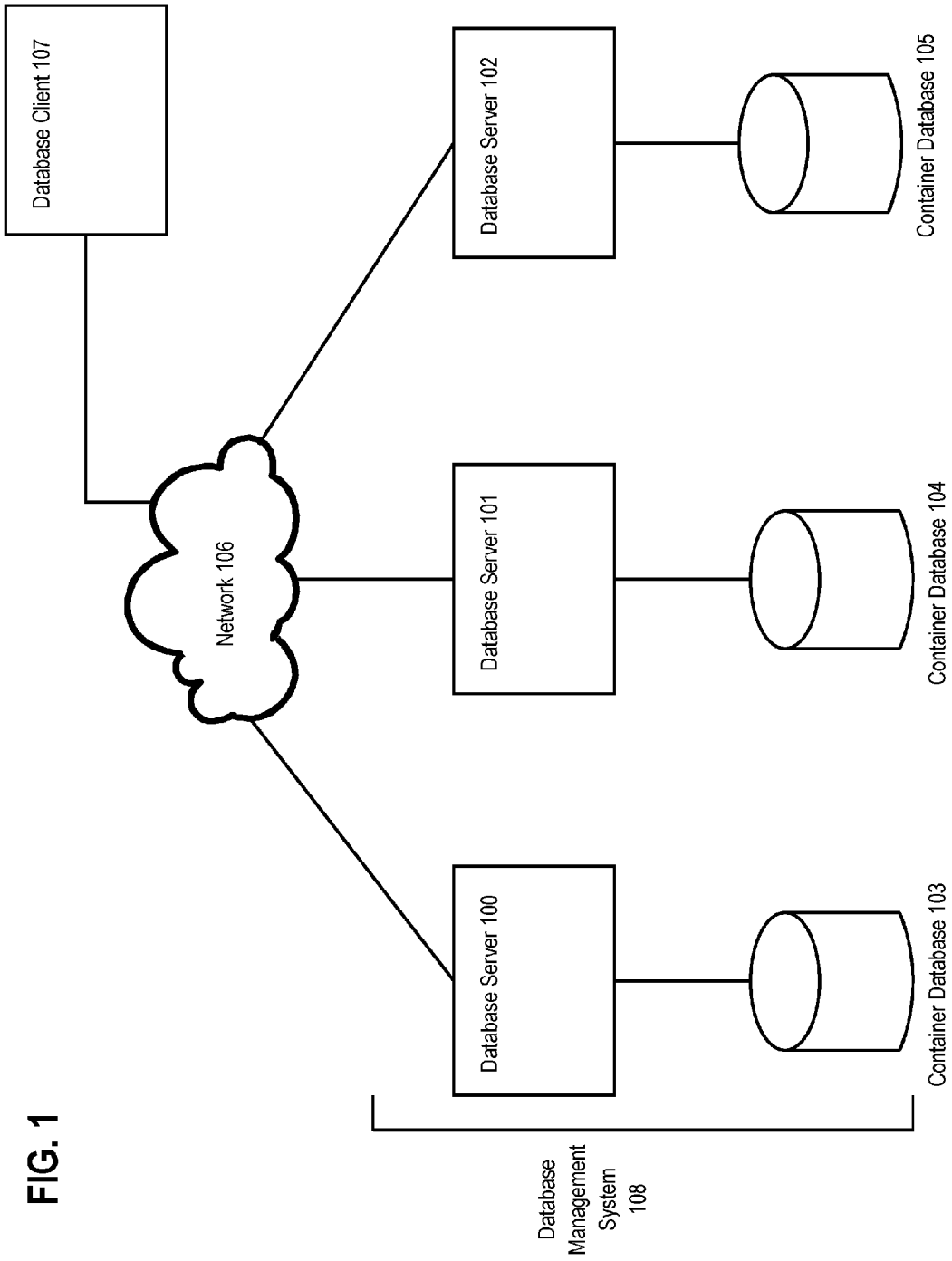
FIG. 1 illustrates an operating environment upon which an embodiment may be implemented.

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The detailed description is laid out in the following sections:

1.0 General Overview
1.1 Proxy Pluggable Databases
1.2 Application Root Replicas
1.3 Container Maps
1.4 Query Optimization
2.0 Database Systems
3.0 General Operating Environment
3.1 Container Database
3.2 Root Database
3.3 Undo and Redo Records
4.0 Proxy Pluggable Databases
4.1 Proxy Pluggable Database Environment
4.2 Proxy Pluggable Database Structure
4.3 Command Execution Process Flow
5.0 Application Root Replicas
5.1 Application Root Replica Environment
5.2 Application Root Replica Structure
5.3 Patch/Update Execution Process Flow
6.0 Container Maps
6.1 Container Map Structure
6.2 Container Map Pruning Process Flow
6.3 One Tier Example
6.4 Two Tier Example
7.0 Query Optimizations
7.1 Push Down of Predicates
7.2 Push Down of Local Joins
7.3 Push Down of Local Joins Based on Statistics
7.5 Parallel Recursive Query
7.6 Statistics Collection Techniques for Proxy PDBs
8.0 Hardware Overview
9.0 Additional Disclosure

1.0 GENERAL OVERVIEW

In the following explanations databases, such as root, application root, proxy PDB, PDB, CDB, and so forth may be described as performing actions such as updating, forwarding, storing, receiving, and so forth. However, when databases are described in the aforementioned manner this is intended to be shorthand for a database server that is responsible for the database performing the action within the context of the specified database.

In order to execute commands against a CDB, a database client connects to either the root database or one of the PDBs. If the database client connects to one of the pluggable databases, the commands issued by the database client are typically confined to the data within that PDB. Thus, from the perspective of the database client, the PDB to which the client connects appears as a traditional database. However, since each PDB "belongs" to the root database, a command executed at the root may potentially affect any or all of the PDBs. For example, a DBMS may implement a keyword for a command that causes the command to be executed on all PDBs within a CDB or a subset of PDBs by specifying the IDs of the PDBs within the subset. In some embodiments, the aforementioned functionality is implemented using a CONTAINERS clause in the SQL statement which, when wrapped around a database object (such as a table), indicates the command should be applied to all instances of the database object across the containers of the CBD. For instance, the SQL statement "SELECT enam FROM CONTAINERS (scott.emp) WHERE CON_ID IN (45, 49)", indicates that the column "enam" should be selected from table "scott.emp" for all PDBs whose ID is 45 or 49.

However, commands such as the CONTAINERS clause are typically limited to accessing data within pluggable databases that are local to the CDB upon which the command was executed. To resolve this issue some DBMSs implement a feature referred to as a "database link". A database link is a pointer that defines a one-way communication path from one database to another. The database link allows a user of a first database to access and manipulate objects stored on another database. The database link is defined within the data dictionary table of a database and contains the information required to locate and connect to another database. For example, links to local databases (such as other PDBs within the same CDB) may specify the ID of the target database whereas links to remote databases may specify network information for the responsible database server (e.g. domain name, IP address, port number, etc.) as well as the ID number of the target database within the remote CDB. A database link connection is one-way in the sense that a client connected to local database A can use a link stored in database A to access information in remote database B, but users connected to database B cannot use the same link to access data in database A. If local users on database B need to access data on database A, then a link is defined in the data dictionary of database B that points to database A. Once a database link is established an object referred to by a SQL statement can be qualified with the name of the database link to indicate that the command is to be forwarded to the appropriate database server for execution on the linked database.

While features such as the CONTAINERS clause and database links are useful for compiling information from local and remote PDBs, the aforementioned features suffer from a lack of locational transparency. In other words, the SQL statements which use the aforementioned features must explicitly specify that the features are being used and supply/reference information that identifies how to reach the target database. For instance, the CONTAINERS clause identifies the database by ID and database links use the network information/database ID to which the link was bound when defined by the administrator. As a result, should the location of a PDB change after the application code which utilizes the aforementioned features has been written, the application code must be rewritten to use the proper mechanism and information for accessing the PDB at its new location.

For example, assume CDB1 includes {PDB1, PDB2} and the application code includes a SQL statement which uses a CONTAINERS clause to access the "emp" table of both PDBs. If at some later point in time PDB1 is relocated to CDB2 for load balancing purposes, the application code would no longer produce the intended effect since PDB1 is no longer a member of CDB1 and would not be accessible using the aforementioned SQL statement. Instead, the application code would have to be rewritten to use a database link to PDB1 to achieve the intended effect.

The process of continuously rewriting application code to compensate for the changing locations of PDBs places an enormous strain on the application developer and significantly limits the usefulness of transporting PDBs.

1.1 Proxy Pluggable Databases

In an embodiment, transparency with respect to the location of a PDB can be achieved by utilizing a "proxy pluggable database" (also referred to as a "proxy PDB"). When a PDB is moved from one location to another, the PDB is replaced with a proxy PDB at the original location which includes none of the data stored by the PDB, but instead contains the information required to forward commands to the database server that is presently responsible for the PDB. Thus, if a database client connects to the proxy PDB on CDB1 through a first database server, the commands received from the database client are redirected to a second database server responsible for CDB2 which contains the actual PDB to which the proxy points. Similarly, if a database client connects to the root of CDB1 and issues commands that are to be executed on the proxy PDB, those commands are then redirected to database server responsible for CDB2 to be executed on the actual PDB to which the proxy points. In both cases, the second database server returns the result to the first database server, which then forwards the result to the database client. In some cases the first database server may also aggregate the results, such as the case where the command causes results to be generated from multiple PDBs that need to be merged before being forwarded to the database client.

As a result, application code can remain completely agnostic as to the actual location of the PDB and does not have to be rewritten to refer to the new location of a moved PDB. For example, given the SQL statement "SELECT enam FROM CONTAINERS (scott.emp) WHERE CON_ID IN 45", even if the PDB corresponding to ID "45" were to be moved to a new CDB, a proxy PDB can be established in its place which uses the ID "45" and causes the database server to forward the commands to the new location of the PDB. The application code can remain the same since the database server responsible for the proxy PDB would be able to use the proxy PDB to access the network information of the database server responsible for the new location of the PDB and the ID of the PDB within the remote CDB in order to forward the statement along for execution. Similarly, if the PDB target of a database link were to be moved to a new location, the target can be replaced with a proxy that causes commands sent through the link to be forwarded to the new location without redefining the link.

1.2 Application Root Replicas

In addition to transparency, the concept of proxy PDBs can also be used to bypass the inherent limit on the number of PDBs that a single CDB can contain. Due to hardware and/or software constraints, CDBs are typically only able to contain up to a maximum number of PDBs. If that number is exceeded, additional PDBs must instead be stored within a new CDB. However, maintaining multiple CDBs poses a challenge to efficient management, such as ensuring that updates and patches are applied consistently across the different CDBs.

Within a single CDB some embodiments introduce the concept of an "application root" to simultaneously manage multiple PDBs that are used by a common application. Additional details regarding application roots can be found in "Application Containers in Container Databases", U.S. application Ser. No. 15/331,525, by Andre Kruglikov et al., filed concurrently with the present application on Oct. 21, 2016, the entire contents of which is incorporated by reference for all purposes as though fully stated herein. Similar to the root of a CDB, an application root separates out the objects that are shared across multiple PDBs. While the root of a CDB stores information that is common to all the PDBs of a CDB (such as shared objects supplied by the developer of the DBMS), the application root is used to store objects that are shared across PDBs used by the same application. This is accomplished through the use of "data-linked" data, where the metadata defining the data and the data itself reside within the application root and "metadata-linked" data where the metadata defining the data resides within the application root and the data itself resides within the member PDBs. For instance, "data-linked" data may represent tables which are shared or common across all member PDBs and "metadata-linked" data may represent tables which share a common definition that is defined within the database dictionary of the application root, but records of the table differ between the member PDBs. As a result, the root of a CDB prevents duplication of shared definitions and objects across all the PDBs, whereas an application root prevents duplication of shared definitions and objects across PDBs used by a common application. Since this shared data typically includes the schemas to which the tables utilized by the application adhere, patches and updates can be applied to the application root in order to synchronize the modifications across all the PDBs that are members of the application root.

In addition, similar to how any PDB within a CDB can be accessed by establishing a session to the root database, establishing a session to an application root provides access to all the PDBs which are members of the application root. For example, a query that includes a CONTAINERS clause executed at the application root could apply the query to all instances of the specified database object across the application root and its member PDBs, provided that the query does not include a predicate limiting the PDB IDs to which the query applies.

In order to expand the concept of an application root across multiple CDBs, some embodiments implement a feature referred to as "application root replicas". An application root replica is created by establishing a proxy PDB as a member of the application root which points to an application root on a remote CDB, which is referred to as the application root replica. The application root replica is kept in sync with the application root by forwarding commands which apply a patch or update to the application root through the proxy PDB to the application root replica. For example, upon receiving a command that would update the application root, the database server responsible for the application root checks the member PDBs of the application root for a proxy which points to an application root on a remote CDB. If such a proxy PDB is located, the database server uses the forwarding information stored within the proxy PDB to forward the commands that implement the update to the database server responsible for the application root replica. Thus, the application root and the application root replica are kept up to date with the same version of the application.

For example, assuming the update includes a DDL command defining a new column of a table within a shared schema stored by the application root that DDL command is also forwarded for execution on the application root replica. Thus, if a patch or update is applied to the application root, the commands encapsulated by that patch or update are also forwarded for execution on the application root replica. In addition, the aforementioned commands may modify the PDBs that are members of the application root/application root replica to effectuate the required changes. As a result, an administrator only has to execute the patch or update on the original application root in order to update the replica. Further, this process can be repeated recursively with an application root replica having its own replica stored on other CDBs, which effectively allows the number of PDBs managed through the original application root to scale upwards indefinitely. Thus, instead of connecting to each application root individually to issue the commands, the commands can be issued at the original application root and propagated through all the linked replicas.

In some embodiments, a "hub and spoke" model may be used instead, where the original application root forwards the commands to all the replicas, rather than using a chain of linked replicas. In some circumstances, the hub and spoke model may minimize the risk that one node in the chain will malfunction and prevent updates from being propagated to later replicas in the chain. Furthermore, in the event that results are returned due to executing the commands, the hub and spoke model may decrease the resources that would otherwise be required to have multiple database servers forward the results back to the original application root along the chain.

Furthermore, queries issued at the application root (unless limited to non-proxy PDBs) will also be forwarded through the proxy PDB to the application root replica on the remote CDB. The application root replica would then in turn run the query on its member PDBs before shipping the result back to the original database server. The database server would then be able to aggregate the results before returning the results to the database client that issued the query. Thus, issuing a query at the application root also allows the query to be executed on all the linked application root replicas and their member PDBs from a single convenient location.

1.3 Container Maps

A technique that may be used by databases to optimize queries is to physically partition a database table according to a partitioning key that is dependent one or more attributes of the table. A mapping is then established between values of the partitioning key and the region of storage indicating the partition where the records of the table that correspond to those values are stored. For example, the mapping may be based on range (each partition is assigned a range of values of the partitioning key), list (each partition is assigned a list of values of the partition key), hash (value of a hash function determines membership in a partition), composite (combinations of the aforementioned mappings), and so forth. As a result, when a query is received the database server can consult the mapping to determine the partitions which are implicated by the query and prune away the remaining partitions.

For example, assume the partitioning key is on the column "season" of a database table, where P1 contains the records where "season=spring", P2 contains the records where "season=summer", P3 contains the records where "season=fall", and P4 contains the records where "season=winter". If a query is received to return records of the table where season is fall or winter, the database server can omit executing the query on records within P1 and P2 since the records stored in those partitions are guaranteed not to match the predicates of the query. As a result, less resources have to be spent executing the query since those records are "pruned away" and do not have to be read by the database server.

However, rather than physically partitioning the table, some embodiments perform the partitioning logically by using separate PDBs to store the records corresponding to each partition. Expanding upon the season example above, PDB1 may be used to store the records of the table corresponding to the partitioning key "season=spring", PDB2 may be used to store the records corresponding to the partitioning key "season=summer", and so forth. The mapping is maintained by an object stored within the application root referred to as a "container map", which maintains the mapping between values of the partitioning key and the PDBs which store the records corresponding to those values. The mapping scheme used by the container maps may be any of those mentioned above, such as range, list, hash, composite, and so forth without limitation. When a query is received at the application root, the database server consults the container map to identify the PDBs which are implicated by that query and then executes the query only on the PDBs which have been identified. Thus, by not querying the other PDBs, the database server effectively prunes away data that is guaranteed not to satisfy the query and saves the cost of reading those records.

The number of PDBs serving as partitions may even be expanded by utilizing proxy PDBs and application root replicas. As discussed above, the number of PDBs that can be contained within a single CDB is limited, thus the number of logical partitions that can be established is also limited. However, this limitation can be bypassed by establishing a container map which maps between some values of the partitioning key and a proxy PDB which points to an application root replica. The application root replica then maintains its own container map which further partitions the data among its member PDBs. Thus, when the query is received at the original application root, the container map is consulted to identify which PDBs that are members of the application root are implicated and then executes the query on the identified PDBs. If the proxy PDB was identified, the query is forwarded to the corresponding application root replica on the remote CDB. The application root replica then consults its own container map to identify which PDBs that are members of the application root replica are implicated and then executes the query on the identified PDBs. The results are then passed back to the application root and potentially aggregated with other results produced by the query before being returned to the database client. Thus, a chain of proxy PDBs pointing to application root replicas can be established until any arbitrary number of logical partitions is reached.

For example, assume CDB1 includes an Application Root, PDB1, PDB2, and proxy PDB3 which points towards an Application Root Replica on CDB2 which also includes PDB4 and PDB5. The Application Root stores Container Map 1 which specifies that the data is partitioned on a country column of a table, where PDB1 is responsible for "US" data, PDB2 is responsible for "UK" data, and proxy PDB3 is responsible for the remaining countries. The Application Root replica stores Container Map 2 which specifies that the data is partitioned on the country column, where PDB4 is responsible for "RU" data and PDB5 is responsible for the remaining countries. If a query is received at the Application Root for rows of the table where the country column is "US" or "RU", Container Map 1 is consulted to determine that PDB1 and proxy PDB3 are implicated by the query. The query is then executed on PDB1 and proxy PDB3. However, since proxy PDB3 is a proxy that points towards the Application Root Replica, the query is forwarded to the Application Root Replica on CDB2 for execution. At the remote site, Container Map 2 is consulted to determine that only PDB4 is implicated by the query. As a result, the query is executed on PDB4, with the results returned to the site where the original query was received at the Application Root. The original site then aggregates the results returned from PDB4 and PDB1 and forwards the aggregated result to the client that issued the query.

In the example above both Container Map 1 and Container Map 2 use the same partitioning key. However, some embodiments may choose to use a different partitioning key at each site in order to best prune the data and optimize queries. Furthermore, the logical partitioning scheme discussed above may also be combined with a physical partitioning scheme. For example, the data may be logically partitioned in various PDBs, but physically stored within those databases according to another partitioning key or mapping technique. Thus, in such embodiments, a first round of pruning is performed at the logical level by pruning away the PDBs that are guaranteed not to be implicated by the query based on the logical partitioning key stored by the container map. Next, a second round of pruning can be performed by omitting read operations to memory locations holding data guaranteed not to satisfy the predicates of the query based on the physical partitioning key. As a result, more data can potentially be pruned away to improve query execution efficiency than utilizing either technique alone.

1.4 Query Optimization

One issue that arises when executing queries across multiple (often remotely situated) CDBs is the overhead required to send results back across the network to the site of the original query. In many cases, the order in which a query is computed can have drastic consequences related to the size of the result that would need to be transferred back across the network.

For example, consider two tables that each have 1,000 rows and suppose a query is received to compute the cross join of the two tables. A cross join produces the Cartesian product of the two tables, which results in rows which combine each row of the first table with each row of the second table. Given that each table has 1,000 rows, this results in 1,000,000 rows that would need to be shipped back to the client. Thus, if the query which includes the cross join were executed on a proxy PDB and shipped as-is to the remote site, the remote site would compute the cross join and send all 1,000,000 rows back through the network. However, much of this overhead can be avoided if the query is instead broken into separate queries for the rows of the first table and the second table respectively, with the cross-join being computed by the original site. Thus, in this case the remote site would only need to ship back 2,000 rows (1,000 rows for each table) and then the cross join could be computed without the need to transfer the bulk of the results from the remote site to the original site where the query was first received.

However, in other cases, computing a join at the remote site actually decreases the amount of data that would need to be transferred back across the network. For example, consider again the two tables that each have 1,000 rows and suppose a query is received that performs an inner join using the equality of two respective columns of the two tables as a predicate. The number of records that result from the inner join is dependent on how many rows of the respective tables satisfy the equality predicate. The result of an inner join is equivalent to taking the cross product and then returning the rows which satisfy the predicate. Thus, in the worst case scenario the number of rows returned is the same as the cross product example above, in the best case scenario no rows will be returned, with most cases falling somewhere in between. As a result, it is entirely possible that the execution of the inner join will result in less data being returned than issuing each query separately. In such cases, it is more efficient to execute the join at the remote site and then ship the result back to the original site.

Furthermore, the order in which the query is computed also affects the efficiencies achieved through parallelism. In some embodiments, the database server includes multiple processors which can be invoked to process queries and other commands in parallel. Thus, for instance, a query received at the application root may be handled by a query coordinator process executing on a first processor, but when the query is then executed on the member PDBs, the query may be handed off to one or more other slave processes executing on one or more other processors that execute the query in parallel across the PDBs. Once the slave processes have completed and returned the results to the master process, the master process can then compile the results for return to the database client. As a result, pushing joins down into the PDBs allows the joins to be executed in parallel, thus speeding up the overall execution of the query. Otherwise, the query coordinator process would have to collect the results from each of the slave processes and then execute the join itself, which in most cases would be significantly slower.

Thus, in some embodiments, when a query is received by a database server which is to be executed on a PDB, a query optimizer is invoked to generate a query plan that determines the order in which the query is processed, including which joins should be pushed down and executed by the slave processes and which should be performed by the query coordinator process. The factors that the query optimizer uses to develop the query plan may include whether the query is to be executed on a proxy PDB (and thus require the result to be shipped across a network), an estimated cost of the result (resource footprint of executing the query according to a particular plan), search heuristics (for searching through and evaluating the potential orders in which a given query may be executed), the types of joins being computed, and so forth without limitation.

Implementations of a query optimizer may use differing factors to determine a query plan, but most rely heavily upon a reasonable estimation of the cardinality of the result returned by the query and/or various sub-parts of the query. To compute the cardinality, query optimizers require accurate statistics related to the columns of the queried table, such as cardinality of the columns, values which repeat a significant number of times, distribution of values within the columns, and so forth. Thus, in some embodiments, the data dictionary of each container (PDBs, application root, root), stores statistics related to its members tables. As a result, when a query is received, the query optimizer is able to read the statistics within the corresponding data dictionary in order to determine a query plan. However, in the case of proxy PDBs, the aforementioned statistics would be stored at the remote site along with the PDB that the proxy points towards. In some embodiments, the database server responsible for the PDB periodically ships the statistics back to the database server responsible for the proxy for storage in the proxy at the local site. As a result, the local site when preparing a plan that will be executed on a proxy PDB is able to retrieve the statistics for the PDB at the remote site in order to estimate the cardinality of the result that the PDB would ship back under various query plans.

In addition to pushing down joins, there are also advantages to pushing down other query operators, such as predicates, grouping operations, and sorting operations. By pushing the aforementioned operators down to be executed by the slave processes more efficient execution of the query can be achieved due to the fact that those operations will be performed in parallel by the slave processes, rather than serially by the query coordinator process. Furthermore, in the case of proxy PDBs, pushing down predicate filtering will often result in a smaller result set that would need to be returned through the network.

2.0 DATABASE SYSTEMS

Embodiments of the present invention are used in the context of DBMSs. Therefore, a description of a DBMS is useful.

A DBMS manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to one or more databases. Typically, the nodes are interconnected via a network and share access, in varying degrees, to storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

3.0 GENERAL OPERATING ENVIRONMENT

FIG. 1 illustrates an example computer-networking environment upon which an embodiment may be implemented. Although FIG. 1 only depicts a particular number of each element, a practical environment may have many more, perhaps hundreds or thousands, of each of the elements illustrated in FIG. 1.

In FIG. 1, database server 100, database server 101, and database server 102 (collectively "the database servers") each represent a combination of software and resources on one or more computing devices that are communicatively coupled to their respective databases (container database 103, container database 104, and container database 105 respectively) and are communicatively coupled to each other via network 106 and also to database client 107. Container database 103, container database 104, and container database 105 are collectively referred to as "the container databases". An example of a computing device upon which the database servers may be implemented is described below in the "Hardware Overview". In some embodiments, the database servers are configured to accept user commands, such as such as queries, Data Definition Language (DDL), and Data Manipulation Language (DML) instructions, and carry out those commands on their respective container database.

In an embodiment, network 106 represents one or more local networks, wide area networks, internetworks, or service provider networks. In some embodiments, network 106 represents the Internet.

In an embodiment, the database client 107 represents a combination of software and resources on one or more computing devices which implements one or more applications that send commands to the database servers in order to retrieve, modify, delete, or submit data stored by the container databases. An example of a computing device upon which the database servers may be implemented is described below in the "Hardware Overview".

3.1 Container Database

Figure 2:
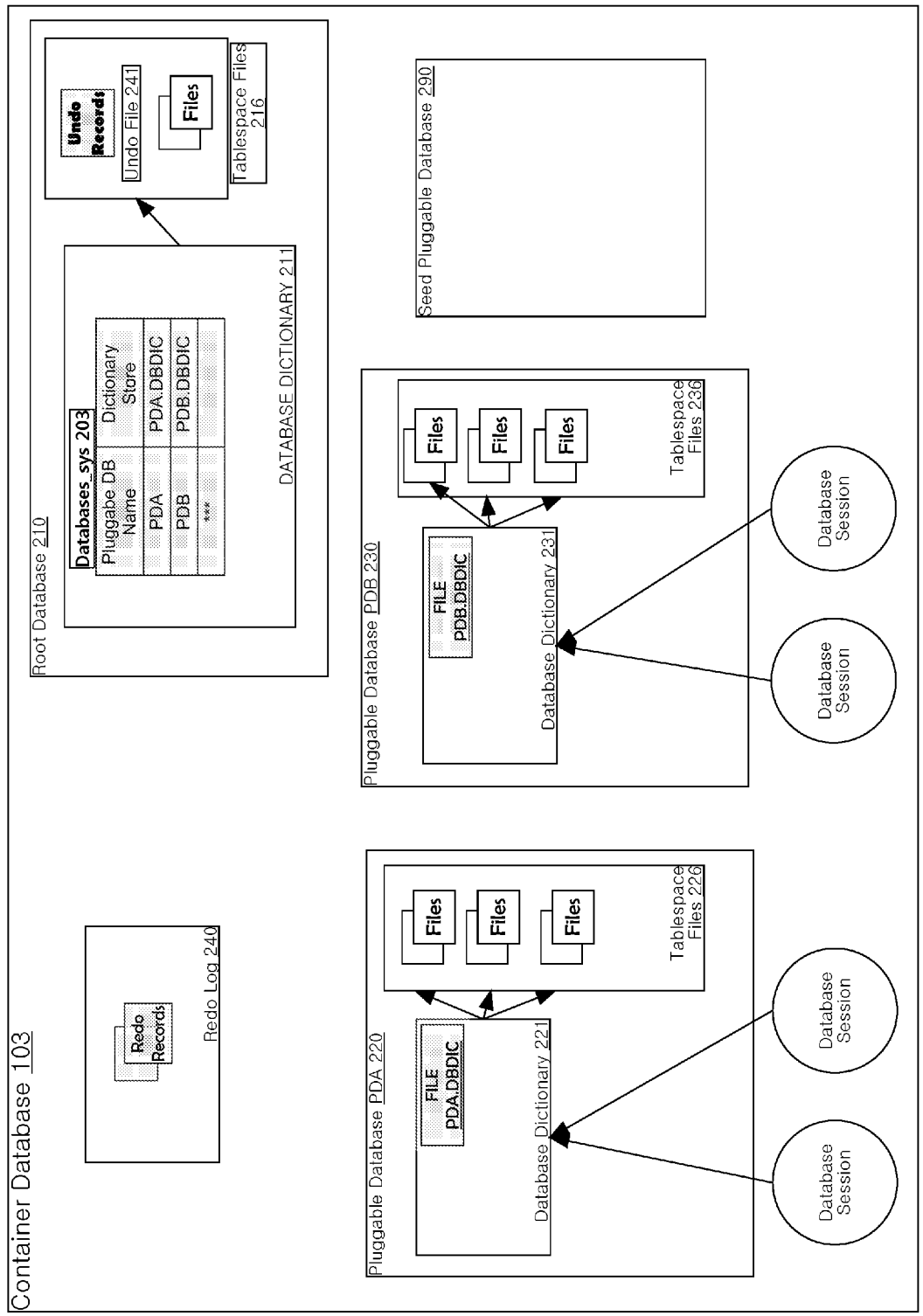
FIG. 2 illustrates a structure of a container database according to an embodiment.

FIG. 2 illustrates an example structure for a general container database according to an embodiment. In order to illustrate clear examples, FIG. 2 is described with respect to container database 103, but the description also applies to container database 104 and container database 105 as well.

Container database 103 contains multiple databases that are hosted and managed by database server 100. The databases include pluggable database PDA 220 and pluggable database PDB 230, and root database 210, which is associated with pluggable database PDA 320 and pluggable database PDB 230, as shall be explained in greater detail below. In other embodiments, the container database 103 may contain more pluggable databases than the number of pluggable databases that are depicted in FIG. 2. However, due to inherent hardware limitations, some implementations may set an upper limit on the number of pluggable databases that the container database 103 can support. Root database 210 is a database that is used by the database server 100 to globally manage container database 103, and to store metadata and/or data for "common database objects" that are accessible to users of the member PDBs.

Pluggable database PDA 220 includes database dictionary 221. Data for database objects of pluggable database PDA 220 is stored in tablespace files 226. Similar to user data, metadata for a database dictionary is stored persistently in a dictionary store. Metadata contained in database dictionary 221 is stored in file PDA.DBDIC.

Pluggable database PDB 230 includes database dictionary 231. Tablespace Files 236 store data for database objects of pluggable database PDB 230. Metadata for database dictionary 231 is stored persistently in file PDB.DBDIC.

The database server 100 responsible for the container database 103 may establish database sessions the root database 210 or any of the member pluggable databases. The database to which the database session connects determine the scope of the commands issued by the database client 107 (e.g. which database(s) the command will be executed on), which permissions are checked, which database dictionaries will be used for the session, and so forth.

3.2 Root Database

Root database 210 is a database used by the database server 100 to globally manage the container database 103. An important function facilitated by root database 210 is to define pluggable databases within the container database 103. Similar to pluggable databases, the root database 210 includes a database dictionary 211. The database dictionary of a root database may be referred to herein as a root database dictionary. Database dictionary 211 contains metadata that defines various aspects of the container database 103 needed to administer container database 103 and the pluggable databases contained therein. Data for database objects defined by database dictionary 211 is stored in tablespace files 216.

Database dictionary 211 includes database object Database_sys 303, which may be represented as a table. Database_sys 203 defines pluggable databases within the container database 103 and attributes of Database_sys 203 each describe an aspect or property of a pluggable database. The attribute Pluggable DB is a name or label for a pluggable database. The attribute Dictionary Store identifies a dictionary store that holds metadata pointing towards the database dictionaries of the member pluggable databases. One record in database dictionary 211 defines pluggable database PDA 220 and its dictionary store file PDA.DBIDC. Another record in database dictionary 211 defines pluggable database PDB 230 and its dictionary store PDB.DBIDC.

In an embodiment, the database dictionary 211 defines common database objects that are shared or commonly used by the pluggable databases in container database 103. A common database object is defined in a pluggable database dictionary, which includes a reference to the common database object in the respective root database dictionary. Examples of common database objects include vendor supplied functions, utilities, tables, and views.

According to an embodiment, there are two types of common database objects: a metadata-linked object and an object-linked object. For both, metadata for the common database object is stored in the root database 210. However, for a metadata-linked object, data for the common database object, if any, is stored in a pluggable database. Thus, for a metadata-linked object, different pluggable databases may store different data for the same common database object. For an object-linked object, both the metadata and data for the database object, if any, are stored in the root database 210. Data for this type of common database object is the same for pluggable databases in the container database 103.

Seed pluggable database 290 contains database objects and a database dictionary. Seed pluggable database 290 is cloned to rapidly create a nascent pluggable database and facilitates fast provisioning of such pluggable databases. Seed pluggable database 290 contains a basic set of database objects that are commonly needed and/or used. For example, seed pluggable database 290 may contain database object links to common database objects and views for accessing the pluggable database dictionary and other system information.

3.3 Undo and Redo Records

Tablespace files 216 of the root database 210 include an undo file 241, which the database server 250 uses to store data and/or metadata ("undo records") related to transactions on the databases contained within container database 103. In some embodiments, the undo records store a before and after image of the data being modified during the transactions. For example, if during a transaction the Database Server 350 modifies a "STATE" column of a particular row to change the value from "OHIO" to "CALIFORNIA", the database server 100 also stores an undo record in the undo file 341 specifying the before value "OHIO", the after value "CALIFORNIA", and the location of the modification (e.g. the data block or blocks being modified). If a transaction needs to be rolled back, the database server 100 backtracks through the undo records to reverse any modifications the transaction had performed. The undo records may store metadata related to the state of the corresponding transactions, such as metadata indicating whether a transaction is active, has already committed, or is in the process of being rolled back.

Undo records can be used for a variety of purposes, such as rolling back transactions, recovering the database, providing read consistency, etc. In some embodiments, the undo file 241 is a finite size and thus the database server 100 may overwrite the undo records to save space as the transactions occur. For example, the segments storing the undo records may be reused after the corresponding transaction ends (e.g. by committing or being rolled back). However, in other embodiments, the database server 100 may retain the undo records for a period of time after the corresponding transactions have ended. For example, the undo records may be retained to provide read consistency for long running queries.

Container database 103 also includes redo log 240, which the database server 100 uses to store data and/or metadata ("redo records") related to modifications performed on the container database 103. For example, each time the database server 100 changes a data block of the container database 103, the database server 100 also stores a redo record in the redo log 240 that identifies the block(s) being modified and specifies the before/after values.

In some embodiments, the database server identifies redo records based on the state of the database being modified. For example, the database server 100 may maintain a "system change number" (SCN) for the container database 103. The database server 100 increments the SCN each time a transaction commits on one of the underlying databases. The SCN is shared among the root database 210 and the pluggable databases. When the database server 100 generates a redo record, the redo record is tagged or otherwise associated with information identifying the database being modified and the corresponding SCN. Thus, the SCN serves to identify the state of the corresponding database at the time the redo record was created. In other embodiments, a timestamp may be used to the same effect.

The redo log 240, as a result, stores a stream of redo records that can be used by the database server 100 to replay modifications to the container database 103 when a recovery is required.

4.0 PROXY PLUGGABLE DATABASES

One of the major benefits to the structure of PDBs is the ability to transport PDBs between CDBs in a quick, efficient, and easy-to-use manner. However, as discussed above, the current mechanisms available to issue commands on PDBs are not transparent with respect to the location of the PDB. As a result, application administrators are forced to constantly rewrite their application code in order to ensure that the PDB can still be accessed after the move.

Thus, in some embodiments, when a PDB is moved from one location to another, the PDB is replaced with a proxy PDB at the original location which includes none of the actual data stored by the PDB, but instead contains the information required to forward commands to the database server that is presently responsible for the PDB. As a result, commands that are issued on the proxy PDB are automatically forwarded to the new location of the PDB for execution without the need to rewrite the application code.

4.1 Proxy Pluggable Database Environment

Figure 3:
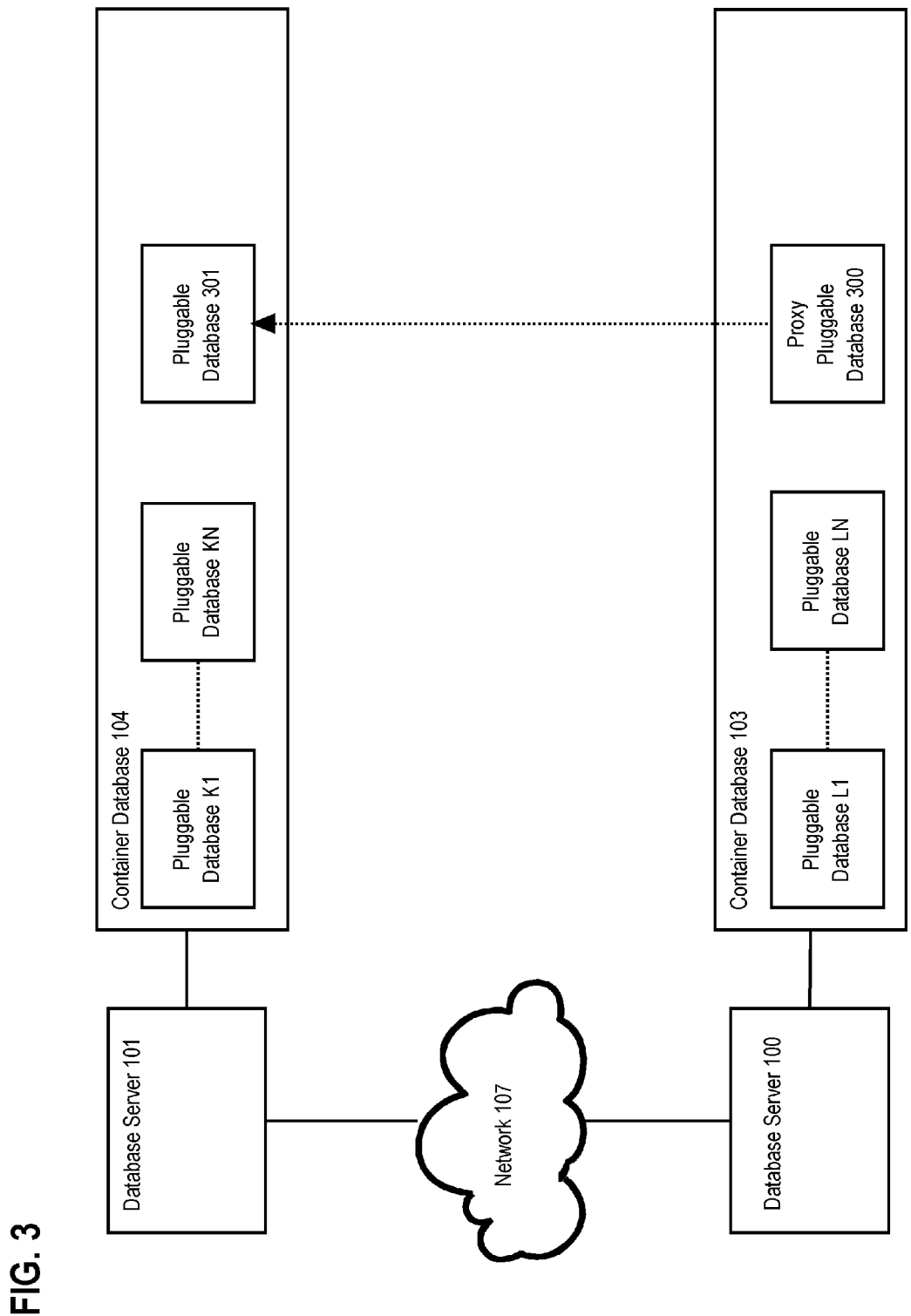
FIG. 3 illustrates an example computing environment that utilizes a proxy pluggable database according to an embodiment.

FIG. 3 illustrates an example computing environment that utilizes a proxy pluggable database according to an embodiment. Although FIG. 3 only depicts a particular number of each element, a practical environment may have many more, perhaps hundreds or thousands, of each of the elements illustrated in FIG. 3.

In FIG. 3, database server 100 manages container database 103 which includes pluggable databases L1-LN and proxy pluggable database 300, which is a proxy for pluggable database 301 on container database 103. Database server 101 manages container database 104 which includes pluggable databases K1-KN and pluggable database 301, the target of proxy pluggable database 300.

4.2 Proxy Pluggable Database Structure

Figure 4:
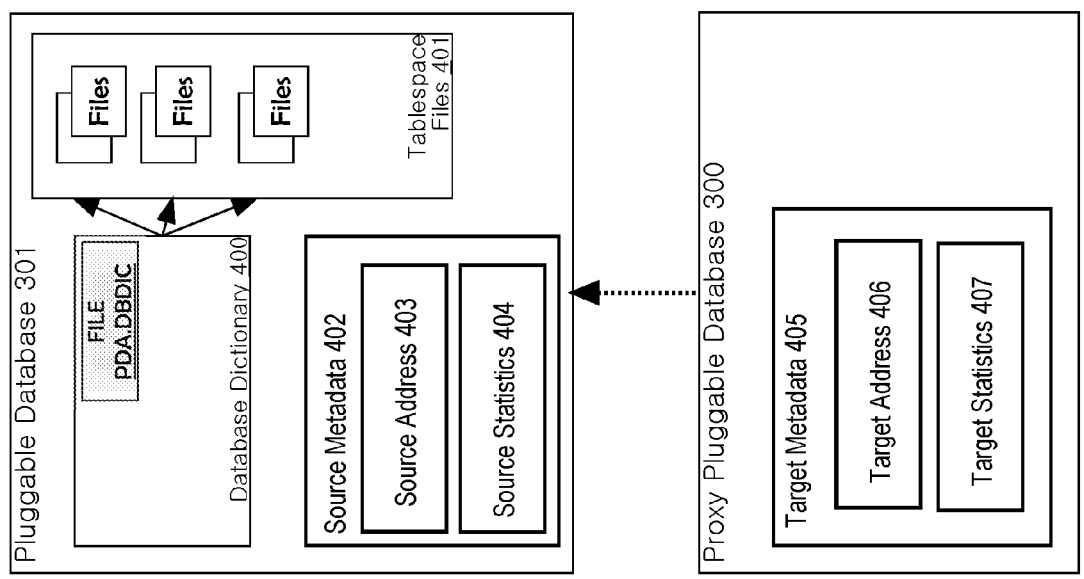
FIG. 4 illustrates a structure of a pluggable database in comparison to the structure of a proxy pluggable database according to an embodiment.

FIG. 4 illustrates a side-by-side comparison of a proxy pluggable database and a pluggable database to which the proxy points according to an embodiment. FIG. 4 is explained in reference to proxy pluggable database 300 and pluggable database 301, but the described features are applicable to other proxy pluggable databases and pluggable databases as well.

In an embodiment, pluggable database 301 includes database dictionary 400, tablespace files 401, and source metadata 402 which includes source address 403 and source statistics 404. As discussed above with respect to FIG. 2, the database dictionary 400 comprises metadata that defines database objects contained in a database and the tablespace files 401 are a set of one or more files that are used to store the data for various types of database objects, such as tables.

The source metadata 402 includes the source address 403 of the proxy pluggable database 300, which may be represented by the network address of the database server 100 responsible for the proxy pluggable database 300, a port address through which the database server 100 receives messages, and an ID that identifies the proxy pluggable database 300 within container database 103. In addition, the source metadata 402 includes source statistics 404 related to the objects (e.g. tables) within the pluggable database 301, such as distribution of values within various columns of a table, cardinality of various columns, commonly repeating row values for various columns, and so forth. The source statistics 404 may be used to help generate query plans as explained in more detail below in Section 7. The source address 403 may be used for a variety of purposes, such as sending the statistics 404 to the proxy pluggable database 300 for storage in order to be used by the database server 100 to develop a cross-container database query plan. In addition, in some embodiments, if the location of the pluggable database 301 were to be moved to a new location, database server 101 may use the source address 403 to contact database server 100 to update the target address 307 of the proxy pluggable database 300 to reference the new location. As a result, manual updates of the target address 307 can be avoided to reduce the number of tasks an administrator would need to perform in order to transport the pluggable database 301.

In an embodiment, proxy pluggable database 300 includes target metadata 405 which comprises target address 406 and target statistics 407. The target address 406 may be represented by the network address of the database server 101 managing the pluggable database 301 to which the proxy pluggable database 300 points, a port address through which the database server 101 receives messages, and an ID that identifies the pluggable database 301 within container database 104. The target address 406 is used to forward commands executed on the proxy pluggable database 302 to the pluggable database 301. The target statistics 407 represents the statistics 404 related to the pluggable database 301 that have been sent by database server 101 to database server 100 for storage in proxy pluggable database 300. The target statistics 407 are then used to develop query plans for queries which make use of the pluggable database 301 via the proxy pluggable database 300. The statistics 404 and the target statistics 407 may not always remain perfectly in sync depending on the statistics gathering mechanism utilized by the database management system 108. Examples of statistics gathering mechanisms are described below in Section 7.5.

4.3 Command Execution Process Flow

Figure 5:
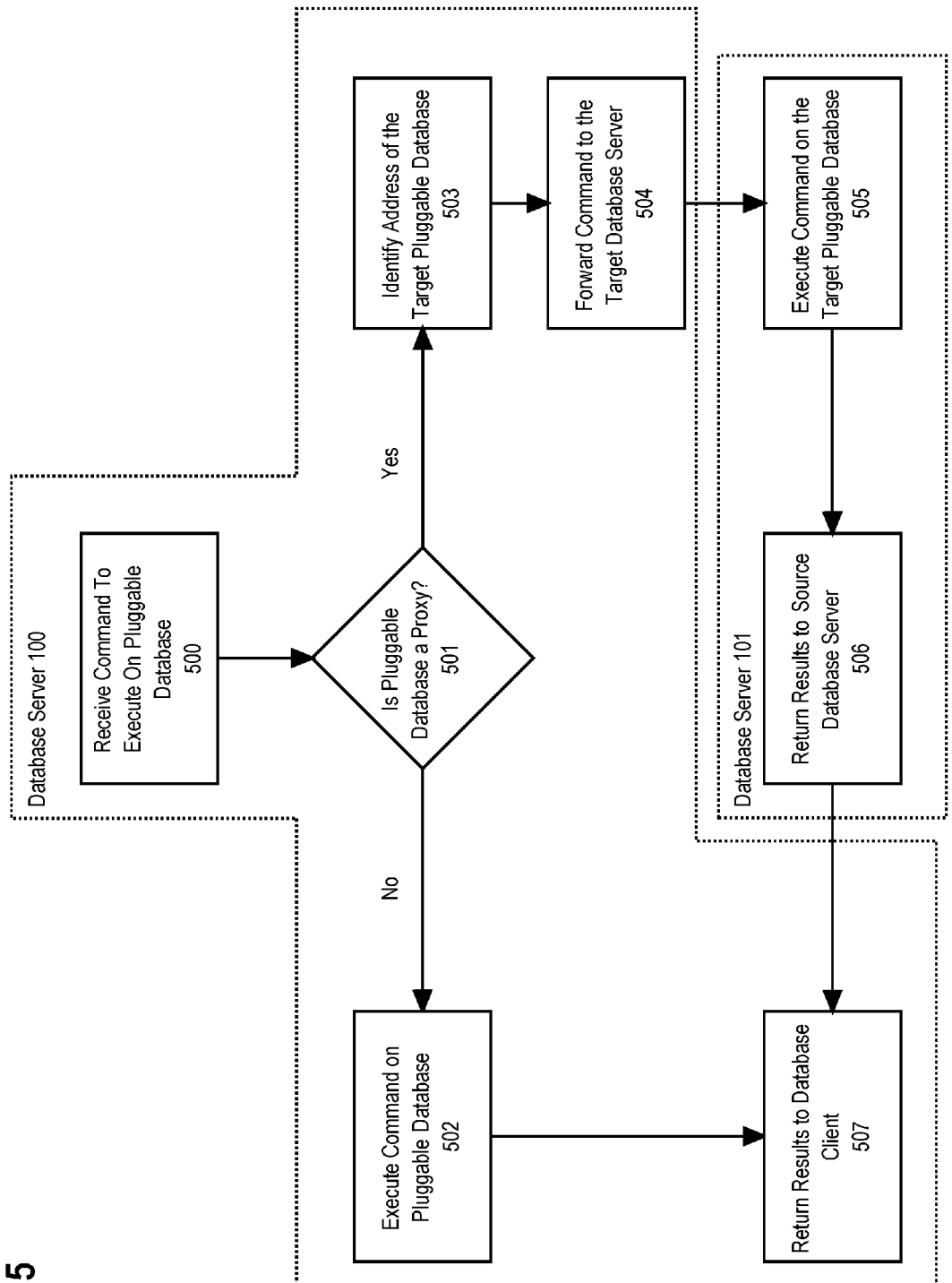
FIG. 5 illustrates a process flow for executing a command in an environment that utilizes proxy pluggable databases according to an embodiment.

FIG. 5 illustrates an example process flow for executing a command on a proxy pluggable database in block diagram form according to an embodiment. In other embodiments, the blocks depicted in FIG. 5 may be performed in a different order, divided into a larger set of blocks, or merged into a smaller set of blocks compared to the process flow depicted in FIG. 5. The following explanation assumes the process flow is executed in the environment depicted in FIG. 3, with the command being received by database server 100 for execution of proxy pluggable database 300. Furthermore, in the branch of the process flow where the command is executed on a proxy pluggable database the explanation assumes that proxy pluggable database 300 is the database upon which the command was executed. In some embodiments, a command may require execution on multiple PDBs, such as cases where a command is executed on a root/application root that affects multiple member PDBs. In such cases the process flow of FIG. 5 may be repeated for PDB sequentially or in parallel using a number of additional processes.

In FIG. 5, at block 500 the database server 100 receives a command to be executed on a pluggable database of container database 103 from the database client 107. For example, the command may be a query, a DML command, a DDL command, a command which controls administrative functions, and so forth. In some embodiments, the database server 100 executes multiple processes referred to as "listeners" which receive messages from clients and invokes a query coordinator process that causes the command to be executed through a slave process on the pluggable database. A pluggable database may be specified by an ID that is unique to each pluggable database within container database 103. For example, the database client 107 may establish a database session with a specific pluggable database by specifying the ID and then submit one or more commands for the database server 100 to execute on the pluggable database. As another example, the database client 107 may establish a database session to the root database 210 or an application root and then submit a command that references the ID of the pluggable database.

At block 501, database server 100 determines whether the pluggable database upon which the command is to be executed is a proxy. In some embodiments, the database server 100 inspects the pluggable database to determine if the pluggable database is a proxy. For instance, the pluggable database may store metadata, such as a flag, that identifies the pluggable database as a proxy. In other embodiments, the database server 100 may inspect the database dictionary 211 of the root database 210 or the database dictionary of an application root for metadata that identifies whether or not the pluggable database is a proxy. If the pluggable database is a proxy, the database server 100 proceeds to block 503. Otherwise, the database server 100 proceeds to block 502.

At block 502, database server 100 executes the command on the pluggable database. In an embodiment, when the database server 100 executes the command on the pluggable database, the effect depends on the type of command received at block 500. For example, if the command is a query the database server 100 may read one or more records of the pluggable database and apply one or more predicates and/or joins to create a result set. If the command is a DML command, the database server 100 may add, delete, or modify one or more records of a database object of the pluggable database. If the command is a DDL command, the database server 100 may define new database objects, modify the definition of existing objects, or delete existing database objects of the pluggable database.

At block 507, database server 100 returns the results to the database client 107. Assuming the command received at block 500 produces a result, the database server 100 returns the result to the database client 107 at block 507. However, some types of commands may not return any result or may only return an acknowledgment indicating whether or not the command has been executed successfully.

At block 503, database server 100 identifies the address of the target pluggable database 301 of the proxy pluggable database 300. In an embodiment, the database server 100 inspects the target address 406 contained within the target metadata 405 to identify the network address and/or port address for the database server 101 managing the pluggable database 301 and the ID of the pluggable database 301 within container database 104.

At block 504, database server 100 forwards the command to the database server 101. In an embodiment, the database server 100 generates a message addressed to the network/port address of database server 101 that contains the command received at block 500 and includes the ID of the pluggable database 301 within container database 104. However, in other embodiments, the database server 100 first establishes a session to the pluggable database 301 via database server 101 and then submits the command after the session has been established.

At block 505, database server 101 executes the command on the pluggable database 301. In an embodiment, when the database server 101 executes the command on the pluggable database 301, the effect depends on the type of command received at block 500. For example, if the command is a query the database server 101 may read one or more records from the pluggable database 301 and apply one or more predicates to create a result set. If the command is a DML command, the database server 100 may add, delete, or modify one or more records of a database object from the pluggable database 301. If the command is a DDL command, the database server 100 may define new database objects, modify the definition of existing objects, or delete one or more existing database objects of the pluggable database 301.

At block 506, database server 101 returns the results of executing the command to database server 100. Assuming the command received at block 500 produces a result when executed at block 505, the database server 101 returns the result to database server 100 at block 506. However, some types of commands may not return any result or may only return an acknowledgment indicating whether or not the command has been executed successfully. The database server 100 then returns the result to the database client 107 at block 507.

5.0 APPLICATION ROOT REPLICAS

An "application root" is a mechanism that can be used to simultaneously manage multiple PDBs that are used by a common application. Similar to the root of a CDB, an application root separates out the objects that are shared across multiple PDBs. While the root of a CDB stores information that is common to all the PDBs of a CDB (such as shared objects supplied by the developer of the DBMS), the application root is used to store objects that are shared across pluggable databases used by the same application. As a result, the root of a CDB prevents duplication of shared objects across all the PDBs, whereas an application root prevents duplication of shared objects across PDBs used by a common application. Since this shared data typically includes the schemas to which the tables utilized by the application adhere, patches and updates can be applied to the application root in order to synchronize the modifications across all the PDBs that are members of the application root. However, unlike the singular root database, a given container database may have multiple application roots to group together PDBs for different applications.

In order to expand the concept of an application root across multiple CDBs, some embodiments implement a feature referred to as "application root replicas". An application root replica is created by establishing a proxy PDB as a member of the application root which points to an application root on a remote CDB, which is referred to as the application root replica. The application root replica is kept in sync with the application root by forwarding commands which implement a patch or update to the application root through the proxy PDB to the application root replica. For example, upon receiving a command that would apply an update to the application root, the database server responsible for the application root checks the member PDBs of the application root for a proxy which points to an application root on a remote CDB. If such a proxy PDB is located, the database server uses the forwarding information stored within the proxy PDB to forward the commands that implement the update to the database server responsible for the application root replica. Thus, the application root and the application root replica are kept up to date with the same version of the application.

In some embodiments, a patch or update represents a set of commands that have been bundled together using key words (such as begin/end blocks) or as part of a script which when executed modifies the application root to a new version or sub-version. In some cases, as part of a patch or update, additional commands are included in the set which also cause changes to the member PDBs to effectuate the patch or update.

5.1 Application Root Replica Environment

Figure 6:
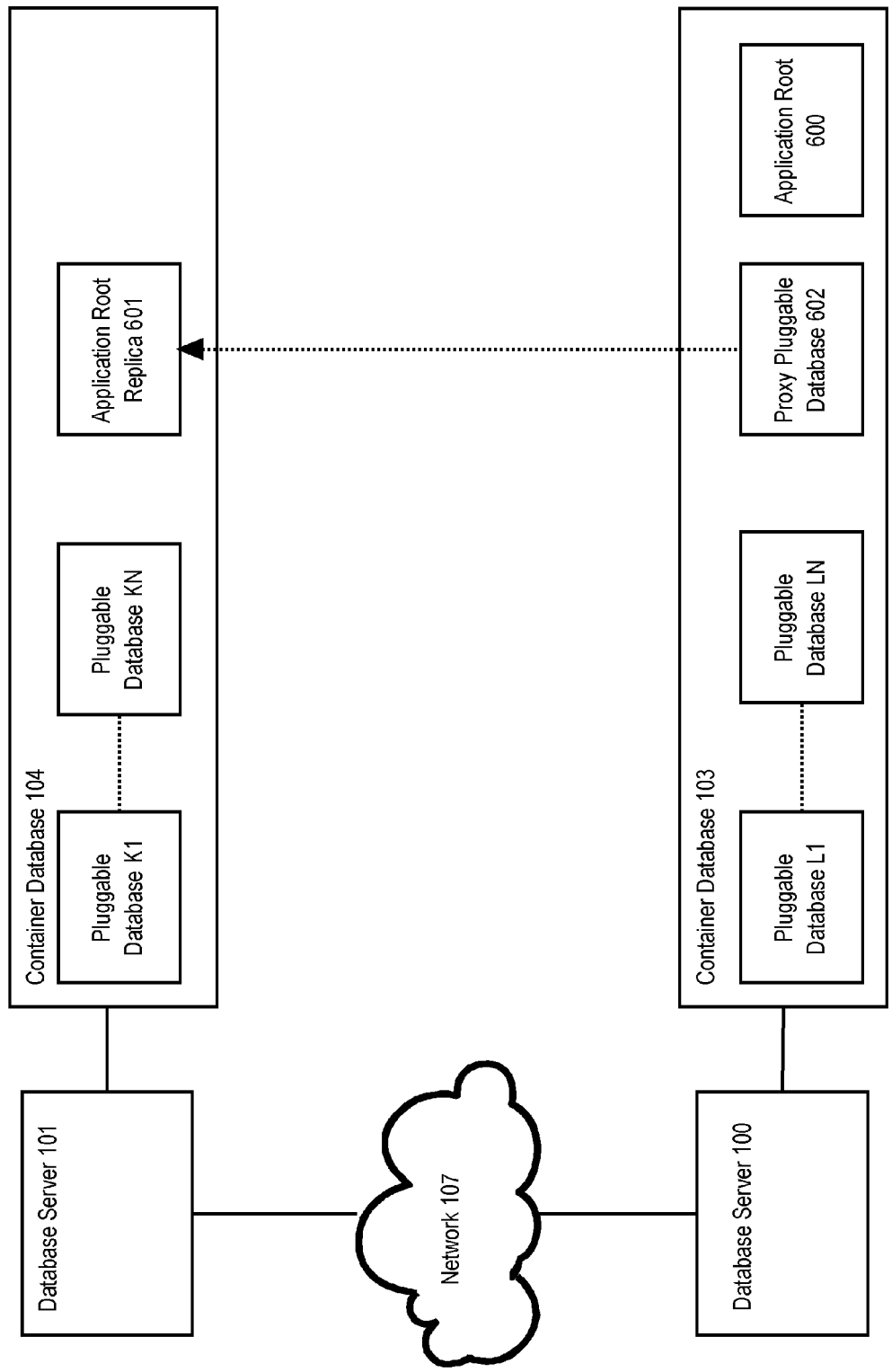
FIG. 6 illustrates an example environment that utilizes an application root replica according to an embodiment.

FIG. 6 illustrates an example computing environment that utilizes an application root replica according to an embodiment. Although FIG. 6 only depicts a particular number of each element, a practical environment may have many more, perhaps hundreds or thousands, of each of the elements illustrated in FIG. 6.

In FIG. 6, database server 100 manages container database 103 which includes pluggable databases L1-LN, proxy pluggable database 602, and application root 600 which is replicated by application root replica 601 in container database 104. Database server 101 manages container database 104 includes pluggable databases K1-KN and application root replica 601, which replicates application root 600.

5.2 Application Root Replica Structure

Figure 7:
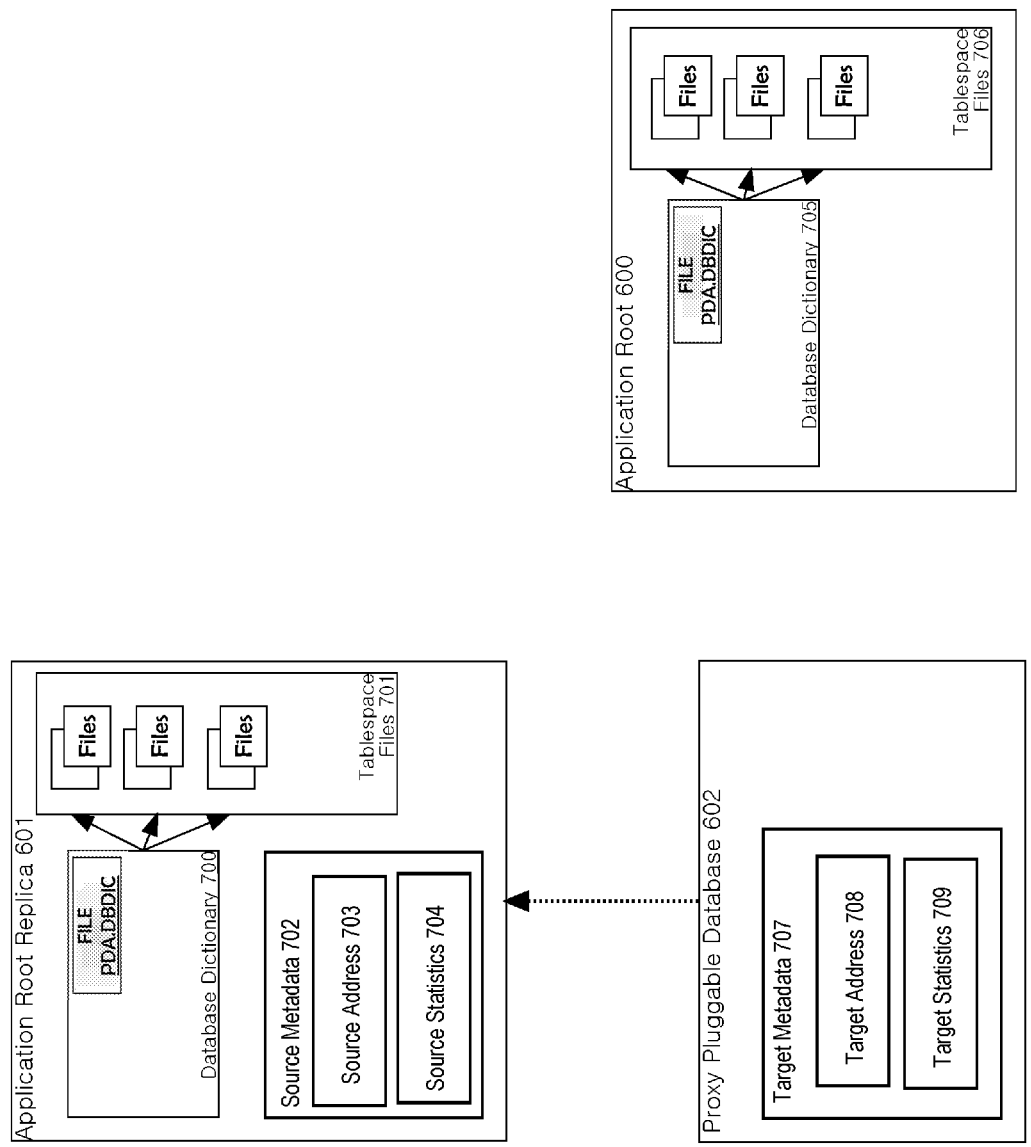
FIG. 7 illustrates a structure of an application root replica in comparison to the structure of an application root and proxy pluggable database according to an embodiment.

FIG. 7 illustrates a side-by-side comparison of an application root, a proxy pluggable database, and an application root replica according to an embodiment. FIG. 7 is explained in reference to application root 600, application root replica 601, and proxy pluggable database 602, but the described features are applicable to other application roots and application root replicas as well.

In an embodiment, application root replica 601 includes database dictionary 700, tablespace files 701, and source metadata 702 which includes source address 703 and source statistics 704. As discussed above with respect to FIG. 2, the database dictionary 700 comprises metadata that defines database objects contained in a database and the tablespace files 701 are a set of one or more files that are used to store the data for various types of database objects, such as tables. In some embodiments the database dictionary 700 or metadata associated with the application root replica 601 includes information that identifies which PDBs within container database 104 are members of the application root replica 601. As a result, the database server 101 can propagate commands issued to the application root replica 601 to the member databases if required for the execution of the command.

The source metadata 702 includes the source address 703 of the proxy pluggable database 602, which may be represented by the network address of the database server 100 responsible for the proxy pluggable database 602, a port address through which the database server 100 receives messages, and an ID that identifies the proxy pluggable database 602 within container database 103. In addition, the source metadata 702 includes source statistics 704 related to the objects (e.g. tables) within the application root replica 601, such as distribution of values within various columns of a table, cardinality of various columns, commonly repeating row values for various columns, and so forth. In some embodiments, the source statistics 704 also include statistics related to the member PDBs, but the storage methodology used to keep track of statistics for the member PDBs is not critical.

For example, each PDB and the application root may maintain their own statistics, with the statistics being collected and sent to the proxy pluggable database 602. As another example, the statistics for each of the member PDBs may be aggregated at the application root replica 601 for transfer to the proxy pluggable database 602. The source statistics 704 may be used to help generate query plans as explained in more detail below in Section 7. The source address 703 may be used for a variety of purposes, such as sending the statistics 404 to the proxy pluggable database 602 for storage in order to be used by the database server 100 to develop a cross-container database query plan. In addition, in some embodiments, if the location of the application root replica 601 were to be moved to a new location, database server 101 may use the source address 703 to contact database server 100 to update the target address 707 of the proxy pluggable database 602 to reference the new location. As a result, manual updates of the target address 708 can be avoided to reduce the number of tasks an administrator would need to perform in order to transport the application root replica 601.

In an embodiment, proxy pluggable database 602 includes target metadata 707 which comprises target address 708 and target statistics 709. The target address 406 may be represented by the network address of the database server 101 managing the application root replica 601 to which the proxy pluggable database 602 points, a port address through which the database server 101 receives messages, and an ID that identifies the application root replica 601 within container database 104. The target address 708 is used to forward commands executed on the proxy pluggable database 602 to application root replica 601. The target statistics 709 represents the source statistics 704 related to the application root replica 601 that have been sent by database server 101 to database server 100 for storage in proxy pluggable database 602. The target statistics 709 are then used to develop query plans for queries which make use of the application root replica 601 via the proxy pluggable database 602. The source statistics 704 and the target statistics 709 may not always remain perfectly in sync depending on the statistics gathering mechanism utilized by the database management system 108. Examples of statistics gathering mechanisms are described below in Section 7.5.

In an embodiment, application root 600 includes database dictionary 705, and tablespace files 706. As discussed above with respect to FIG. 2, the database dictionary 705 comprises metadata that defines database objects contained in a database and the tablespace files 706 are a set of one or more files that are used to store the data for various types of database objects, such as tables. In some embodiments the database dictionary 705 or metadata associated with the application root 600 includes information that identifies which PDBs within container database 103 are members of the application root 600. As a result, the database server 100 can propagate commands issued to the application root 600 to the member PDBs if required for the execution of the command.

5.3 Patch/Update Execution Process Flow

Figure 8:
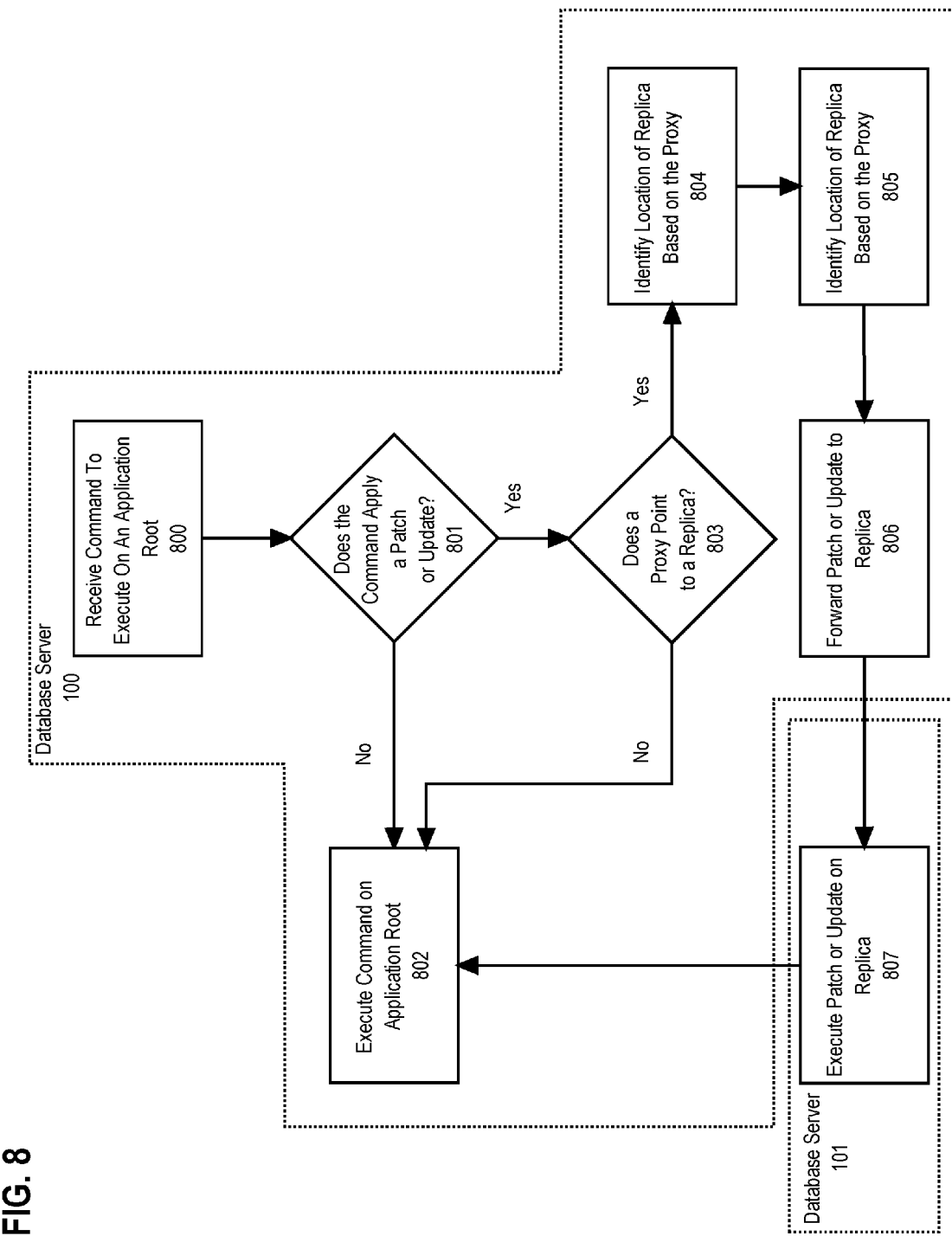
FIG. 8 illustrates a process flow for executing patches and update on an application root according to an embodiment.

FIG. 8 illustrates an example process flow for applying a patch or update to an application root in block diagram form according to an embodiment. In other embodiments, the blocks depicted in FIG. 8 may be performed in a different order, divided into a larger set of blocks, or merged into a smaller set of blocks compared to the process flow depicted in FIG. 8. The following explanation assumes the process flow is executed in the environment depicted in FIG. 6, with the command to apply the patch or update being received by database server 100. Furthermore, in the branch of the process flow where the command is forwarded to an application root replica, the application root is assumed to be application root 600, the application root replica is assumed to be application root replica 601, and the proxy PDB is assumed to be proxy pluggable database 602.

In FIG. 8, at block 800 the database server 100 receives a command to be executed on an application root 600 defined within container database 103 from the database client 107. For example, the command may be a query, a DML command, a DDL command, a command that controls an administrative function, a command which applies a patch or update, and so forth. In some embodiments, the database server 100 executes multiple threads or processes referred to as "listeners" which receive messages from clients and then cause the commands to be executed on the application root 600. The application root 600 may be specified by an ID that is unique to each pluggable database within container database 103. For example, the database client 107 may establish a database session with the application root 600 and then submit one or more commands for the database server 100 to execute on the application root 600.

At block 801, the database server 100 determines whether the command applies a patch or update. In some embodiments, commands which apply a patch or update include one or more specific keywords which indicate that a patch or update is being performed by the command. In some cases, the command may be followed by a set of commands (such as those marked by a begin/end block) that implement the patch or update. In other embodiments, the command may specify a script that contains the set of commands to be applied during the patch or update. If the database server 100 determines that the command applies a patch or update, the database server 100 proceeds to block 803. Otherwise, the database server 100 proceeds to block 802.

At block 802, database server 100 executes the command on the application root 600. In an embodiment, when the database server 100 executes the command on the application root 600, the effect depends on the type of command received at block 800. For example, if the command is a query the database server 100 may read one or more records of the application root 600 and/or one or more member PDBs, aggregate the results, and return the aggregated result to the database client. If the command is a DML command, the database server 100 may add, delete, or modify one or more records of a database object within the application root 600 and/or within one or more member PDBs. If the command is a DDL command, the database server 100 may define new database objects, modify the definition of existing objects, or delete existing database objects within the application root 600 and/or one or more member PDBs. If the command applies a patch or update the database server 100 may execute the set of commands which implements the patch or update.

In some cases, executing the command at the application root 600 may cause the command or parts of the command to be executed on one or more member PDBs of the application root 600. In such cases, the process flow of FIG. 5 may be followed to perform the execution on each of the member PDBs implicated by the command to handle the cases when execution is performed on a proxy PDB. The process performing the process flow of FIG. 8 may spawn additional slave processes that perform the execution of the command in parallel across the affected PDBs. In the case of queries, details of the execution of the command at block 802 is discussed below in more detail in Section 7. As a high-level explanation, the command is received by a query coordinator process of the database server which then spawns one or more slave processes to execute the query on the affected PDBs in parallel and may rewrite the query to perform one or more optimizations. When the query coordinator process receives the results back from the one or more slave processes, the query coordinator process aggregates the results before returning.

In some embodiments, whether the command or partial command is executed on multiple PDBs under the application root 600 is dependent on the database object accessed by the command. For instance, in the case of metadata-linked objects, the data resides in PDBs under the application root 600, rather than the application root 600 itself. Therefore, such a command can only be fulfilled by accessing the PDBs under the application root 600, and unless the command explicitly limits the application of the command to certain member PDBs, this would apply to all the PDBs under the application root 600.

At block 803, the database server 100 determines whether a member PDB of the application root 600 is a proxy that points to an application root replica 601. In some embodiments, the database server 100 consults metadata associated with the application root 600 to determine whether a member PDB is a proxy that points to an application root replica 601. For example, the database dictionary 705 of the application root 600 may include a table that identifies which PDBs are members of the application root 600, whether a member PDB is a proxy, and whether a proxy member PDB points to an application root replica. In the event that multiple proxy PDBs are defined under the application root 600 that point to different replicas the process flow of FIG. 8 from blocks 804 to block 807 may be repeated serially or in parallel for each of the identified proxies. However, in other embodiments, the metadata may be split between the proxy pluggable database 602 and the application root 600. For instance, the database dictionary 705 of the application root 600 may identify the member PDBs, but metadata stored within the proxy pluggable database 602 may indicate whether it is a proxy and whether it points to an application root replica 601. If there are no member PDBs that are proxies which point to an application root replica 601, the database server 100 proceeds to block 802. Otherwise, the database server 100 proceeds to block 804.

At block 804, the database server 100 identifies the address of the application root replica 800. In an embodiment, the database server 100 inspects the target address 708 contained within the target metadata 707 of the proxy pluggable database 602 to identify the network address and/or port address for the database server 101 managing the application root replica 601 and the ID of the application root replica 601 within container database 104.

At block 805, database server 100 forwards the patch or update to the database server 101. In an embodiment, the database server 100 generates a message addressed to the network/port address of database server 101 that contains the set of commands which implements the patch or update and includes the ID of the application root replica 601. However, in cases where the set of commands are identified within a script, the database server 100 may forward the script to database server 101 before issuing a command that causes the script to be executed by the database server 101 on the application root replica 601.

At block 807, database server 101 executes the patch or update on the application root replica 601. In an embodiment, when the database server 101 executes the patch or update on the application root replica 601, the effect of the patch or update depends on the types of commands that implement the patch or update. For example, in the case of DML commands, the database server 101 may add, delete, or modify one or more records of a database object within the application root replica 601 and/or within one or more member PDBs. In the case of DDL commands, the database server 101 may define new database objects, modify the definition of existing objects, or delete existing database objects within the application root replica 601 and/or one or more member PDBs. In some embodiments, a result may be passed back to the database server 100 at the conclusion of block 807, such as an acknowledgment that the patch or update has been successfully applied to the application root replica 807.

6.0 CONTAINER MAPS

As mentioned previously, in some embodiments, rather than implementing physical partitions of a table, partitions are implemented logically using separate PDBs to store the records corresponding to each partition. The mapping is maintained by an object stored within the application root which is referred to as a "container map", which maintains the mapping between values of the partitioning key and the PDBs which store the records corresponding to those values. The mapping scheme used by the container maps is not critical and may include schemes such as range, list, hash, composite, and so forth without limitation. When a query is received at the application root, the database server consults the container map to identify the PDBs which are implicated by the query and then executes the query only on the PDBs which have been identified. Thus, by not querying the other PDBs, the database server effectively prunes away data that is guaranteed not to satisfy the query and saves the cost of reading records within the pruned PDBs.

6.1 Container Map Structure

Figure 9:
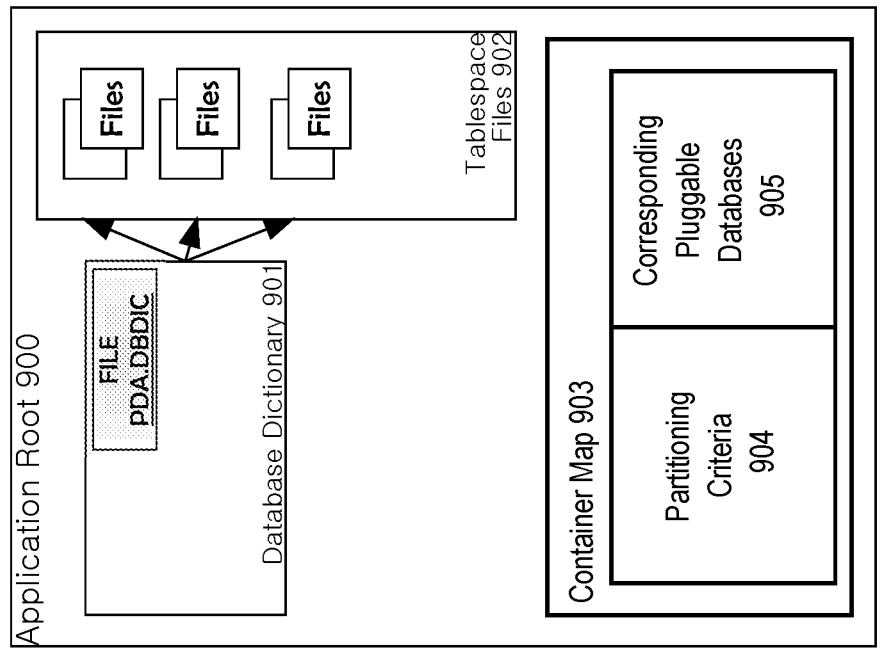
FIG. 9 illustrates a structure of an application root that includes a container map according to an embodiment.

FIG. 9 illustrates an example structure of an application root that includes a container map according to an embodiment. FIG. 9 is explained in reference to application root 900, but the described features are applicable to other application roots as well. FIG. 9.

In FIG. 9, application root 900 includes database dictionary 901, tablespace files 902, and container map 903 (including partitioning criteria 904 and corresponding pluggable databases 905). The database dictionary 901 and tablespace files 902 have the same structure as the database dictionary 706 and tablespace files 707 described above in reference to FIG. 7.

The container map 903 includes two sub-parts, the partitioning criteria 904 and the corresponding pluggable databases 905. The partitioning criteria may differ depending on the partitioning scheme utilized by a given embodiment. For example, in the case of a range partitioning scheme, the partitioning criteria 904 would specify ranges of values for one or more columns of the table which have been used to partition the table across the member PDBs. As another example, in the case of a list partitioning scheme, the partitioning criteria 904 would list the set of values of one or more columns of the table which have been used to partition the table across the member PDBs. The corresponding pluggable databases 905 then specify, for each of the partitioning criteria 904, the PDB which stores the records of the table that match the partitioning criteria 904. Thus, when a query is received at the application root 900, the query can be compared to the partitioning criteria 904 to determine which corresponding pluggable databases 905 have records that could potentially match the query. Those PDBs can then be searched for records matching the query while the remaining PDBs are effectively pruned away and do not need to be searched.

6.2 Container Map Pruning Process Flow

Figure 10:
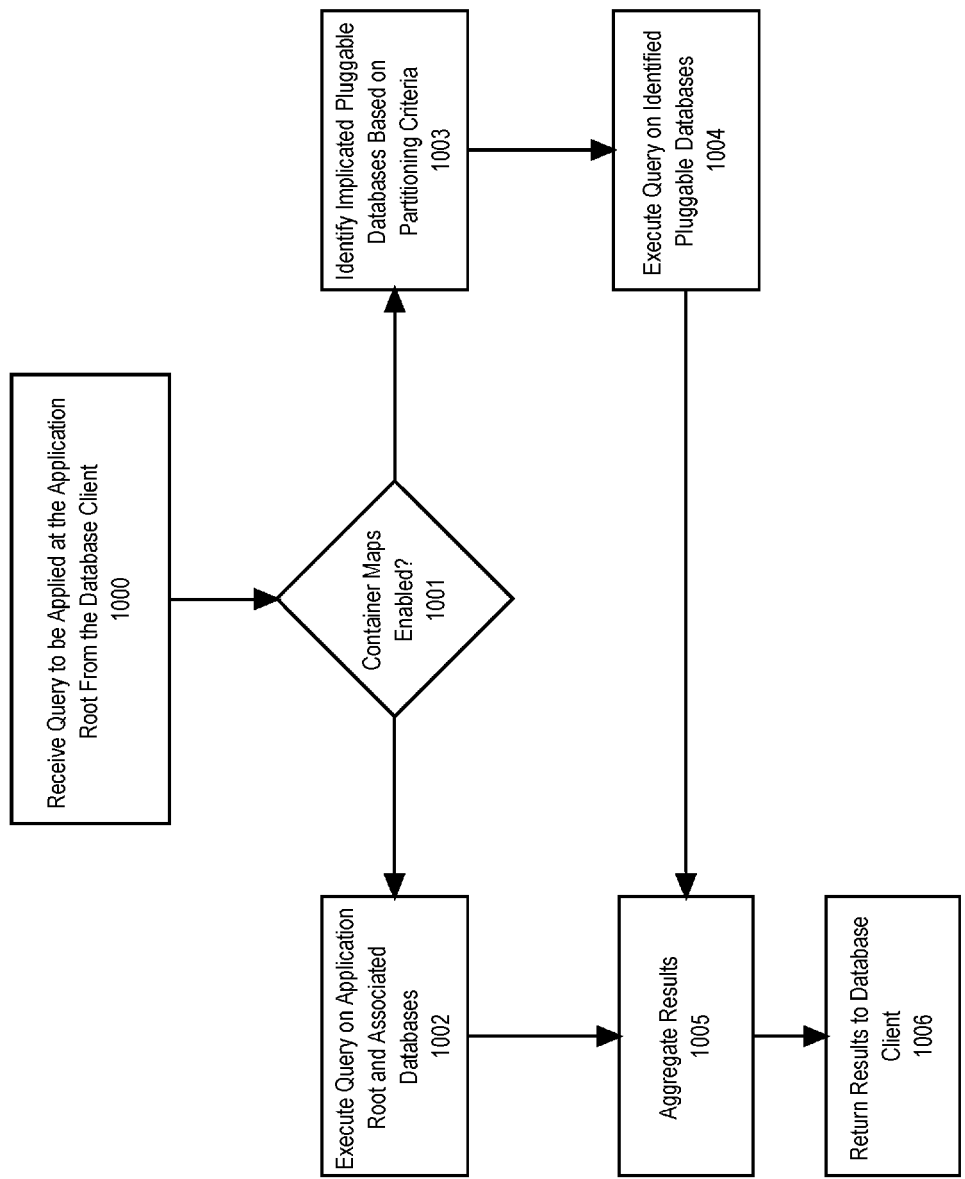
FIG. 10 illustrates a process flow for executing a query using a container map according to an embodiment.

FIG. 10 illustrates an example process flow for executing a query at an application root using container maps according to an embodiment. In other embodiments, the blocks depicted in FIG. 10 may be performed in a different order, divided into a larger set of blocks, or merged into a smaller set of blocks compared to the process flow depicted in FIG. 10. The following explanation assumes that the query is received at application root 900 and that application root 900 is within container database 103 managed by database server 100.

In FIG. 10, at block 1000, the database server 100 receives a query to be applied at the application root 900. In some embodiments, the query specifies one or more database objects (e.g. tables), zero or more predicates to apply to the records contained within the specified database objects, zero or more join operations, and zero or more sorting/grouping operations. In some embodiments, the query is received from the database client 107 after establishing a session with the application root 900.

At block 1001, the database server 100 determines whether the container map 906 has been enabled at the application root 900. In some embodiments, the database server 100 checks metadata (e.g. a flag) associated with the application root 900, which may be contained within the database dictionary 211 of the root database 210, the database dictionary 901 of the application root 900, or other storage location to determine whether the container map 906 is enabled for the application root 900. However, in other embodiments, the database server 100 may check the application root 900 for the presence of the container map 906 and assume that the container map 906 is enabled provided that the container map 906 exists. If the container map 906 is enabled, the database server 100 proceeds to block 1002, otherwise the database server 100 proceeds to block 1003.

At block 1002, the database server 100 executes the query on the member PDBs of the application root 900. The application root 900 itself is considered a member of the application root 900. For example, the database server 100 may read from the database dictionary 901 of the application root 900 to determine the member PDBs and then issue the query on each of the member PDBs. Depending on the implementation of the database server 100, the query may be executed on each of the member PDBs serially or in parallel using a number of additional slave processes that run concurrently to read records from the specified database objects of the affected PDB and applying the specified predicates to filter the records into a result set. In addition, sorting or grouping operations may be applied at block 1004 if included the query received at block 1000. Furthermore, when the query is passed for execution to the slave processes, the query may be rewritten to implement one or more optimizations as described below in Section 7. The process flow followed by the slave processes may mirror the process flow described above in relation to FIG. 5 to handle embodiments where the query might be executed on a proxy PDB. Depending on the query received at block 10000 and the query plan developed by the database server 100, the database server 100 may perform one or more joins at block 1002 across records of different database objects within each PDB upon which the query was executed.

In some cases, the query may limit which member PDBs of the application root 900 the query is executed on, such as by specifying their IDs in the query or using keywords with the query that limit its application. The query may even be limited solely to the application root 900 itself. Furthermore, in some cases during execution of the query, it may be discovered that the member PDB do not contain the specified database object(s). In such cases, depending on the embodiment, an error may be generated by the execution or the result set may be returned as empty or null.

At block 1003, the database server 100 identifies the implicated pluggable databases based on the partitioning criteria. In an embodiment, the database server 100 analyzes the query to determine which predicates relate to the attribute(s) used as a partitioning criteria 907 of the container map 906 of the application root 900. The database server 100 then determines which corresponding pluggable databases 908 contain records which could potentially satisfy the query based on the partitioning criteria 907. For example, consider the case where the container map 906 specifies that PDB A stores records where column K<10, PDB B stores records where column 10≤K≤100, and PDB C stores records where column K>100. If a query is received that includes the predicate "K<90", the database server 100 would identify PDB A and PDB B as being implicated by the query since both of those PDBs store records where K can be below 90. However, since PDB C only contains records where K>100, no records of PDB C can possibly satisfy the query. As a result, in this example, PDB C can be safely pruned and is not identified by the database server 100 at block 1003.

At block 1004, the database server 100 executes the query on the PDBs identified at block 1003. Depending on the implementation of the database server 100, the query may be executed on each of the member PDBs serially or in parallel using a number of additional slave processes that run concurrently to read records from the specified database objects of each PDB and applying the specified predicates to filter the records into a result set. In addition, sorting or grouping operations may be applied at block 1004 if included the query received at block 1000. Furthermore, when the query is passed for execution to the slave processes, the query may be rewritten to implement one or more optimizations as described below in Section 7. The process flow followed by the slave processes may mirror the process flow described above in relation to FIG. 5 to handle embodiments where the query might be executed on a proxy PDB. Depending on the query received at block 10000 and the query plan developed by the database server 100, the database server 100 may perform one or more joins at block 1004.

In some embodiments, whether the query is executed on multiple PDBs under the application root 600 is dependent on the database object accessed by the command. For instance, in the case of metadata-linked objects, the data resides in PDBs under the application root 900, rather than the application root 900 itself. Therefore, such a command can only be fulfilled by accessing the PDBs under the application root 900, and unless the command explicitly limits the application of the command to certain member PDBs, this would apply to all the PDBs under the application root 900.

In some embodiments, as an optimization, the original query is stripped of predicates that are already guaranteed to be satisfied to reduce the time required to apply the query. For example, if the query included the predicate "country=FR OR US", the implicated PDBs may be a first PDB that represents the logical partition holding records where the country is FR and a second PDB that represents the logical partition holding records where the country is US. When the query is sent to the first PDB or the second PDB, that predicate may be removed since the partitioning scheme already ensures that the predicate is satisfied. As a result, no additional checks with regard to that predicate would need to be performed by the processes reading the records from the first and second PDBs.

In some embodiments, executing the query on the member PDBs may cause the query to be executed on application root replicas of the application root 900 located on remote CDBs. The process followed by the remote application root replica is the same as the process flow of FIG. 10. In other words, the process flow is performed recursively at successively linked application root replicas.

At block 1005, the database server 100 aggregates the results of executing the query. In an embodiment, the database server 100 aggregates the results by concatenating together the results of executing the query on each of the member PDBs. Furthermore, based on the query plan developed by the database server 100, some joins and/or grouping/sorting operations may not have been applied during the execution at block 1002 or block 1004. As a result, join operations and/or grouping/sorting operations which have yet to be performed by the slave processes are instead performed during aggregation at block 1005 before the final results are returned to the database client 107 at block 1006. At block 1006, the database server 100 returns the results to the database client 1007. In some embodiments, the results returned to the database client 1007 represent the result of the query as applied to the application root 900 and its member PDBs, including any predicate filtering and/or join operations specified by the query.

6.3 One Tier Example

Figure 11:
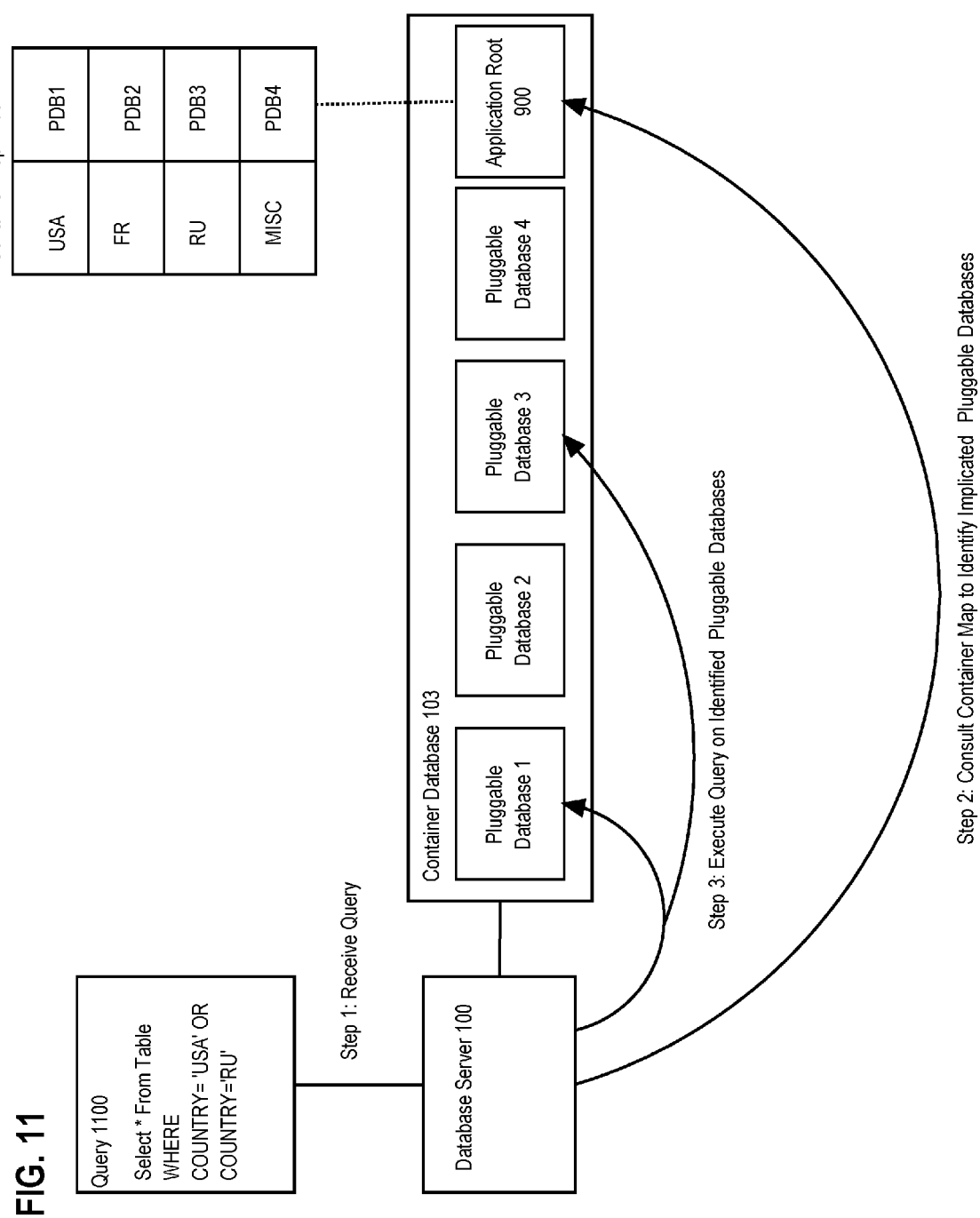
FIG. 11 illustrates an example of using a container map to filter data according to an embodiment.

FIG. 11 illustrates an example of using a container map to filter data according to an embodiment.

In FIG. 11, database server 100 manages container database 103, which includes PDB 1, PDB 2, PDB 3, PDB 4, and application root 900. Application root 900 includes container map 1100 that uses a list partition which partitions records containing a country column into PDB 1 for USA, PDB 2 for FR, PDB 3 for RU, and PDB 4 for the remainder.

In the example of FIG. 11, database server 100 receives a query from a database client which selects records from the table where the country is USA or RU. The database server 100 then consults the container map 1100 of the application root 900 to determine the implicated PDBs. In this case, PDB 1 and PDB3 are implicated by the query since both have the potential to contain records which satisfy the query. The database server 100 then executes the query on PDB 1 and PDB 3, with the results being aggregated and returned to the database client that issued the query.

6.4 Two Tier Example

The previous example in FIG. 11 illustrates the use of a container map to filter data within a single CDB. However, by utilizing proxy databases and application root replicas, the concept of a container map can be applied across multiple CDBs.

Figure 12:
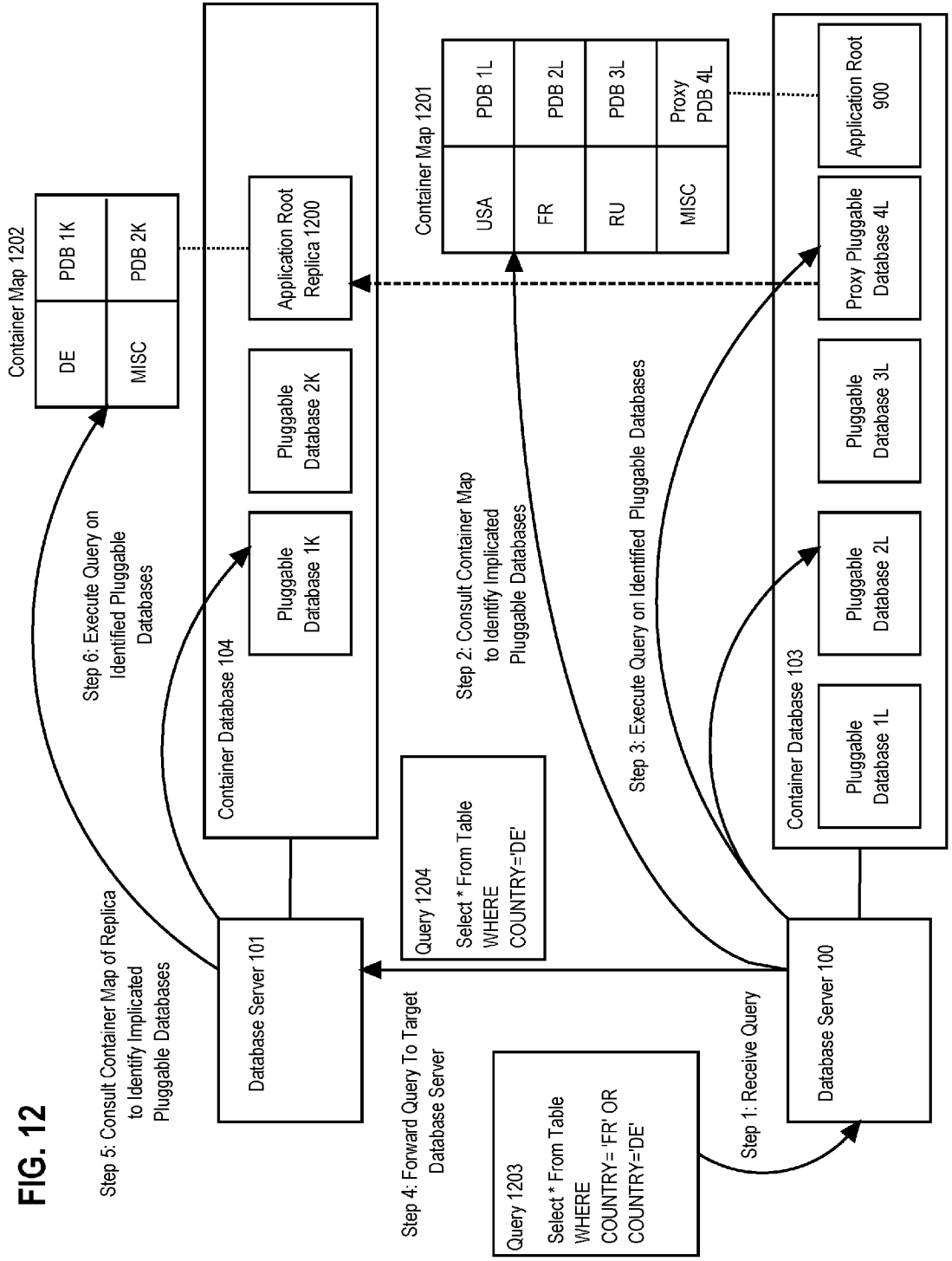
FIG. 12 illustrates an example of using a hierarchy of container maps to filter data according to an embodiment.

FIG. 12 illustrates an example of using a hierarchy of container maps to filter data according to an embodiment.

In FIG. 12, database server 100 manages container database 103, which contains PDB 1L, PDB 2L, PDB 3L, proxy PDB 4L, and application root 900. Application root 900 contains container map 1201 which list partitions on a country column of a table such that PDB 1L is mapped to USA, PDB 2L is mapped to FR, PDB 3L is mapped to RU, and proxy PDB 4L is mapped to the remainder. Database server 101 maintains container database 104, which includes PDB 1K, PDB 2K, and application root replica 1200, which is a replica of application root 900. The application root replica 1200 includes container map 1202 which list partitions on the country column such that PDB 1K is mapped to PDB 1K and the remainder is mapped to PDB 2K.

In the example of FIG. 12, database server 100 receives a query that selects records from the table where the country column is FR or DE. The database server 100 then consults the container map 1201 of the application root 900 to determine which PDBs are implicated by the query, which in this case are PDB 2L and Proxy PDB 4L since both have records that could possibly satisfy the query. The database server 100 then executes the query on the identified PDBs. In the case of PDB 2L, the query is executed normally and the results are prepared to be aggregated with the results from proxy Pluggable PDB 4L. However, Proxy PDB 4L is a proxy PDB that points to application root replica 1200. As a result, the database server 100 forwards the query to database server 101, which then checks container map 1202 stored by the application root replica 1200 to determine the PDBs within CDB104 that are implicated by the query. In this case, PDB 1K is the only PDB implicated by the query on CDB104. The database server 101 then executes the query on PDB 1K, with the results being returned to database server 100 to be aggregated with the results from PDB 2L and returned to the client.

7.0 QUERY OPTIMIZATIONS

Using keywords (such as the CONTAINERS clause discussed above), data in multiple PDBs can be queried during a database session from within a root and/or application root. For example, the following query will return data from multiple PDBs, QA1: SELECT ename FROM CONTAINERS (emp) WHERE CON_ID IN (45, 49);

The CON_ID column for the CONTAINERS clause is included in every row returned by the containers clause and identifies the PDB from which each of the returned rows originated. In the above query, CON_ID identifies PDBs that are associated with IDs 45 and 49.

The query is executed by multiple processes using a parallel slave execution framework. The processes include a query coordinator process and one or more slave processes referred to herein as PQ (Parallel Query) slaves. A PQ slave that accesses a PDB executes within a session context for the PDB; the data dictionary of the PDB is attached to the session of the PQ slave.

In addition, the PQ slaves that access PDBs execute a recursive query generated based on the original query for execution against the PDBs. The recursive query may not be the same (or even semantically equivalent) to the original query. In some embodiments, the recursive query strips out predicates and/or keywords associated with executing the query across multiple PDBs and instead transforms the original query into a recursive query suitable for execution on a single PDB. For example, in the following recursive query QR1 may be generated for query QA1 and given to the PQ slaves, QR1: SELECT ename FROM emp;

The above QR1 is then executed by one or more separate sets of slaves against the PDBs associated with IDs 45 and 49.

7.1 Push Down of Predicates

In some embodiments, a filter predicate is "pushed down" by incorporating the predicate in a recursive query. For example, QA2: SELECT ename FROM CONTAINERS(emp) WHERE emp.age<18;

QR2: SELECT ename FROM emp WHERE emp.age<18

The predicate "emp.age<18" in QA2 is pushed down in recursive query QR2. As a result, the predicate will be checked by each PQ slave in parallel, rather than being performed serially by the query coordinator process. Since the original query lacked a predicate based on CON_ID, a recursive query QR2 is executed on all open PDBs that are members of the application root which received the query. If the member PDB that the recursive query is executed upon is a proxy, the query is sent over to the linked remote PDB.

7.2 Push Down of Local Joins

In another embodiment, join operations may be pushed down for execution on a PDB by a PQ slave within the context of the PDB. For example, when containers (DBA_VIEWS) and containers (DBA_TABLES) are joined together, assuming that the rows are joined based on a match of the column CON_ID column of containers( ), such joins may be completed locally within the context of the PDB. If such an equality predicate does not exist within the query, the join cannot be pushed down since the join would have to be performed across rows drawn from multiple different PDBs, which the query coordinator process would have to perform after receiving the result sets from the PQ slaves. In some embodiments, column CON_ID equality for joins is assumed by default since this case can be performed efficiently in parallel. Thus, the query coordinator process may implicitly add CON_ID equality or the slave processes may be configured to assume a predicate specifying that CON_ID equality exists. However, in such cases, a keyword may be supported to specifically indicate that the CON_ID equality predicate does not exist so as to not limit the types of queries that users can perform.

For example consider the query,

QA3:

select (*)

from containers(dba_tables) t, containers(dba_views) v where t.table_name=v.view_name
and t.con_id=v.con_id An alternative representation for the above query is QA3':

select count(*)
from containers(select t.table_name from dba_tables t, dba_views v
where t.table_name=v.view_name)

The statement within the containers clause is executed as a recursive query within a PDB (a PQ slave executing with the context of a PDB), in effect causing the local join on "t.table_name=v.view_name" to be performed locally within each PDB in parallel. The recursive query QA3' is generated in response to detecting the join based on CON_ID, in query QA3.

7.3 Push Down of Local Joins Based on Statistics

The push down of the join operation may be based on optimizer statistics collected for tables. In the case of a proxy PDB, the statistics for the tables of the remote linked PDB are also stored at the proxy PDB. For example, the following query references an object linked table dep for which the data is stored in the application root and a metadata-linked table emp for which the data is stored in each PDB. Assume that the optimizer statistics indicate dep is a small table and table emp is a large table. Based on the optimizer statistics, a local join is pushed for execution within the context of a PDB, as illustrated by the following queries.

QA4:
Select emp.name, dep.name from containers (emp), dep where emp.dep=dep.id and dep.groupid=5

Here, the query coordinator process determines that dep is a small table and table emp is a large table in each PDB. As a result, it is advantageous to perform the joining at least partially locally within each PDB. An example recursive query that may be generated for performing the local joins is shown below:

QR4:
Select emp.name from emp wherein emp.dep IN (list_of_deps)

The recursive query returns all rows that join with a row in dep where "dep.groupid=5". The recursive query uses an in-memory data structure "list_of_deps" listing the id of each department having rows with "dep.groupid=5". Data for list_of_deps is generated by the application root and passed in via the recursive query.

7.4 Parallel Recursive Query

When the query coordinator for the application container generates an execution plan involving a cross-PDB query, the query coordinator decides a degree of parallelism (DOP, e.g. number of slaves) for the slaves executing in the context of the application container. Anyone of these slaves may be assigned the work of executing a recursive query within the context of a PDB. A PQ slave assigned by the query coordinator that has the responsibility of executing a recursive query within the context of a PDB is referred to herein as a PDB slave.

A PDB slave may then decide on a DOP for executing a recursive query within a PDB. If a DOP greater than one is decided upon, the PDB slave becomes a query coordinator for multiple PQ slaves executing the recursive query. Thus, within one application container on one POD DBMS, a cross PDB query may be executed by multiple query coordinators, one operating within the context of an application root and one or more operating within the context of a PDB as a query coordinator coordinating the execution of multiple PDB slaves of a recursive query.

7.5 Statistics Collection Techniques for Proxy PDBs

As discussed above, query coordinator processes rely upon accurate statistics in order to make determinations during a query plan, such as whether local joins should be pushed down into the recursive query or not. However, in the case of proxy PDBs, statistics such as the size and distribution of tables and other database objects are stored at the remote PDB, rather than locally. This issue can be resolved in multiple ways. In one embodiment, the database server responsible for the remote PDB may periodically push statistics back to the proxy PDB or push the statistics back in response to certain triggers, such as records being updated, deleted, or added to the database objects. In another embodiment, the database server responsible for the proxy may periodically pull statistics from the remote PDB by sending a request or pull the statistics in response to certain events, such as receiving a query that requires execution on the remote PDB. Depending on the technique implemented by an embodiment, the statistics stored at the proxy and the remote PDB may not be perfectly in sync. However, even in such cases the statistics still provide an estimate that the query coordinator process can rely upon to develop a query plan.

8.0 HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
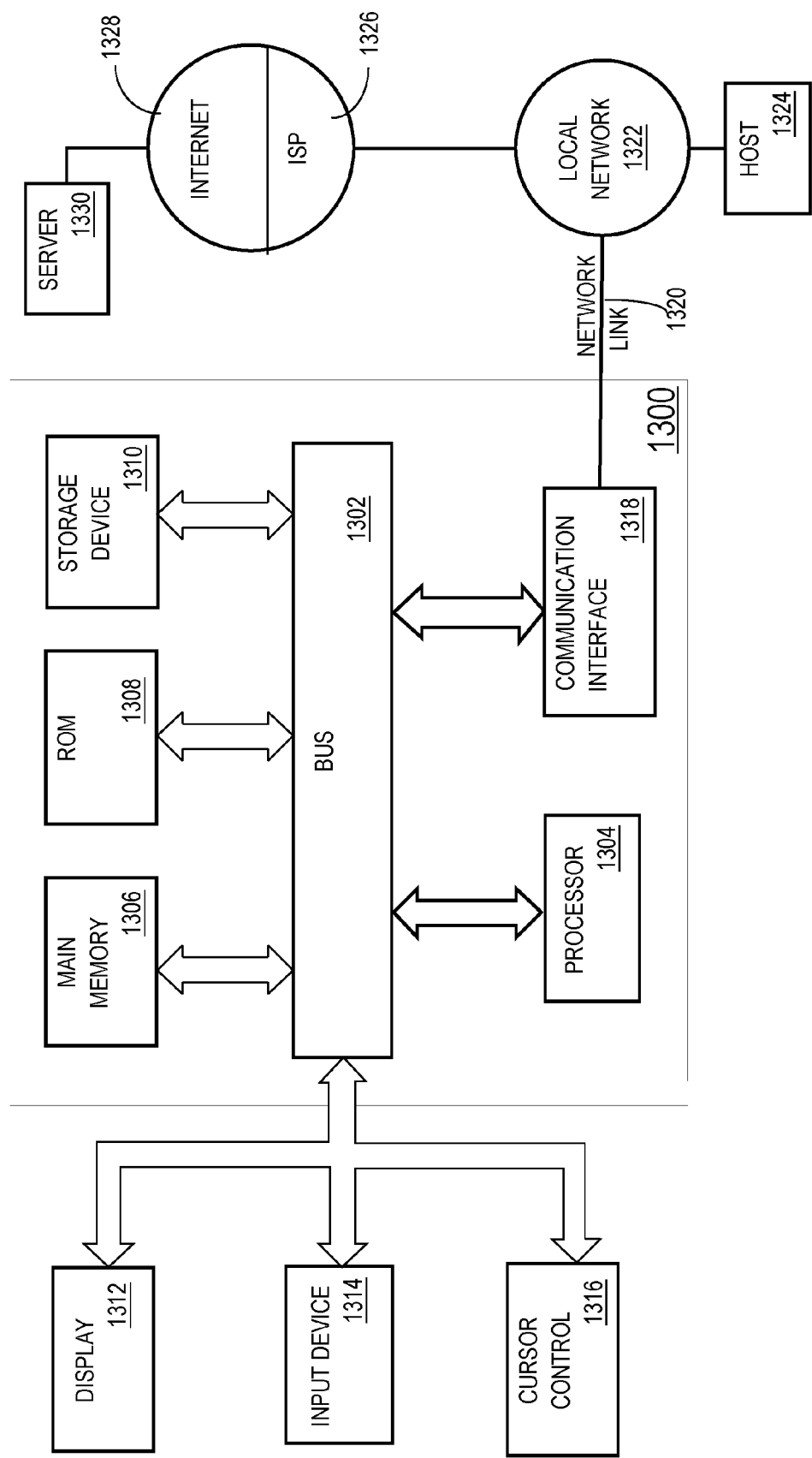
FIG. 13 is a block diagram that illustrates an example computer system upon which an embodiment of the invention may be implemented.

For example, FIG. 13 is a block diagram that illustrates an example computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9.0 ADDITIONAL DISCLOSURE

Additional embodiments are described in the following clauses:

1. A method comprising: receiving, at a first database server, a command to be executed on a first pluggable database of a first container database containing a plurality of pluggable databases from a database client; in response to a determination that the first pluggable database is a proxy, the first database server identifying a target pluggable database of the proxy that is contained within a second container database and accessible through a second database server, wherein the second container database is different than the first container database and the second database server is different than the first database server; the first database server forwarding the command to the second database server for execution on the target pluggable database; in response to receiving a result of executing the command from the second database server, the first database server forwarding the result to the database client.

2. The method of Clause 1, wherein identifying the target pluggable database involves reading information stored within the first pluggable database that identifies one or more of: a hostname of the second database server, a network address of the second database server, a port through which to send messages to the second database server, or an identifier of the target pluggable database within the second container database.

3. The method of any of Clauses 1-2, further comprising: the first database server receiving a message from the second database server indicating that the target pluggable database has been transported to a third container database accessible through a third database server and in response updating the information based on one or more of: a network address of the third database server, a second port through which to send messages to the third database server, or an identifier of the target pluggable database within the third container database.

4. The method of any of Clauses 1-3, further comprising: in response to a determination that the first pluggable database is not a proxy, executing the command on the first pluggable database.

5. The method of any of Clauses 1-4, wherein the target pluggable database stores one or more statistics related to database objects stored within the target pluggable database and further comprising the first database server receiving the one or more statistics from the second database server and storing the one or more statistics within the first pluggable database.

6. The method any of Clauses 1-5, wherein receiving the command to be executed on the first pluggable database is received from the database client after the database client establishes a session to the first pluggable database.

7. The method of any of Clauses 1-6, wherein receiving the command to be executed on the first pluggable database is received from the database client after the database client establishes a session to an application root of which the first pluggable database is a member.

8. The method of Clause 7, wherein the command specifies to apply a patch or update to the application root which is implemented by a set of instructions and further comprising: in response to receiving the command, determining whether the first pluggable database points towards an application root replica; in response to determining that the first pluggable database points towards the application root replica, replacing the command with the set of instructions which implements the patch or update before forwarding the command to the second database server.

9. The method of Clause any of Clauses 7-8, wherein the command to be executed on the first pluggable database is executed on two or more pluggable databases, including the first pluggable database, and further comprising: aggregating results returned from the two or more pluggable databases before forwarding the result of executing the command to the database client.

10. The method of Clause 9, wherein the command is received by a query coordinator process of the first database server which spawns two or more slave processes that are used to execute the command on the two or more pluggable databases in parallel.

11. The method of Claim 1, wherein each pluggable database of the first container database includes a respective database dictionary that defines one or more database objects within the pluggable database.

12. One or more non-transitory computer-readable media storing instructions that, when executed by one or more computing devices, causes performance of any one of the methods recited in Clauses 1-11.

13. A system comprising one or more computing devices comprising components, implemented at least partially by computing hardware, configured to implement the steps of any one of the methods recited in Clauses 1-11.

What is claimed is:
1. A method comprising:
from a database client, receiving, at a first database server, a command to be executed on a first pluggable database of a first container database containing a plurality of pluggable databases;
wherein a database dictionary of said first container database:
defines said first pluggable database, and
specifies that said first pluggable database is a proxy database of a target pluggable database that is contained in a second container database;
wherein said second container database is hosted by a second database server;
inspecting said database dictionary to make a determination that the first pluggable database is a proxy database for said target pluggable database;
in response to said determination that the first pluggable database is a proxy database of said target pluggable database, the first database server forwarding the command to the second database server for execution on the target pluggable database; and
in response to receiving a result of executing the command from the second database server, the first database server forwarding the result to the database client.

2. The method of claim 1, wherein identifying the target pluggable database involves reading information stored within the first pluggable database that identifies one or more of: a hostname of the second database server, a network address of the second database server, a port through which to send messages to the second database server, or an identifier of the target pluggable database within the second container database.

3. The method of claim 2, further comprising:
the first database server receiving a message from the second database server indicating that the target pluggable database has been transported to a third container database accessible through a third database server and in response updating the information based on one or more of: a network address of the third database server, a second port through which to send messages to the third database server, or an identifier of the target pluggable database within the third container database.

4. The method of claim 1, further comprising:
in response to a determination that the first pluggable database is not a proxy, executing the command on the first pluggable database.

5. The method of claim 1, wherein the target pluggable database stores one or more statistics related to database objects stored within the target pluggable database and further comprising the first database server receiving the one or more statistics from the second database server and storing the one or more statistics within the first pluggable database.

6. The method of claim 1, wherein receiving the command to be executed on the first pluggable database includes receiving the command from the database client after the database client establishes a session to the first pluggable database.

7. The method of claim 1, wherein receiving the command to be executed on the first pluggable database includes receiving the command from the database client after the database client establishes a session to an application root of which the first pluggable database is a member.

8. The method of claim 7, wherein the command specifies to apply a patch or update to the application root which is implemented by a set of instructions and further comprising:
in response to receiving the command, determining whether the first pluggable database points towards an application root replica;
in response to determining that the first pluggable database points towards the application root replica, replacing the command with the set of instructions which implements the patch or update before forwarding the command to the second database server.

9. The method of claim 7, further comprising: executing the command on two or more pluggable databases, including the first pluggable database,
aggregating results returned from the two or more pluggable databases before forwarding the result of executing the command to the database client.

10. The method of claim 9, wherein: receiving the command to be executed on the first pluggable database includes a query coordinator process of the first database server which receiving the command; the method further includes said query coordinator process spawning two or more slave processes that are used to execute the command on the two or more pluggable databases in parallel.

11. A non-transitory computer-readable storage medium storing sequences of instructions, which when executed on one or more processors, cause:
from a database client receiving, at a first database server, a command to be executed on a first pluggable database of a first container database containing a plurality of pluggable databases;
wherein a database dictionary of said first container database:
defines said first pluggable database, and
specifies that said first pluggable database is a proxy database of a target pluggable database that is contained in a second container database;
wherein said second container database is hosted by a second database server;
inspecting said database dictionary to make a determination that the first pluggable database is a proxy database for said target pluggable database;
in response to said determination that the first pluggable database is a proxy database of said target pluggable database, the first database server forwarding the command to the second database server for execution on the target pluggable database; and
in response to receiving a result of executing the command from the second database server, the first database server forwarding the result to the database client.

12. The non-transitory computer-readable storage medium of claim 11, wherein identifying the target pluggable database involves reading information stored within the first pluggable database that identifies one or more of: a hostname of the second database server, a network address of the second database server, a port through which to send messages to the second database server, or an identifier of the target pluggable database within the second container database.

13. The non-transitory computer-readable storage medium of claim 12, wherein the sequences of instructions include instructions that, when executed by said one or more processors, cause: the first database server receiving a message from the second database server indicating that the target pluggable database has been transported to a third container database accessible through a third database server and in response updating the information based on one or more of: a network address of the third database server, a second port through which to send messages to the third database server, or an identifier of the target pluggable database within the third container database.

14. The non-transitory computer-readable storage medium of claim 11, wherein the sequences of instructions include instructions that, when executed by said one or more processors cause:
in response to a determination that the first pluggable database is not a proxy, executing the command on the first pluggable database.

15. The non-transitory computer-readable storage medium of claim 11, wherein the target pluggable database stores one or more statistics related to database objects stored within the target pluggable database; and wherein the sequences of instructions include instruction that, when executed by said one or more processors, cause the first database server receiving the one or more statistics from the second database server and storing the one or more statistics within the first pluggable database.

16. The non-transitory computer-readable storage medium of claim 11, wherein receiving the command to be executed on the first pluggable database includes receiving the command from the database client after the database client establishes a session to the first pluggable database.

17. The non-transitory computer-readable storage medium of claim 11, wherein receiving the command to be executed on the first pluggable database includes receiving the command from the database client after the database client establishes a session to an application root of which the first pluggable database is a member.

18. The non-transitory computer-readable storage medium of claim 17, wherein the command specifies to apply a patch or update to the application root which is implemented by a set of instructions; the sequences of instructions include instructions that, when executed by said one or more processors cause:
in response to receiving the command, determining whether the first pluggable database points towards an application root replica;
in response to determining that the first pluggable database points towards the application root replica, replacing the command with the set of instructions which implements the patch or update before forwarding the command to the second database server.

19. The non-transitory computer-readable storage medium of claim 17, wherein the sequences of instruction include instructions that, when executed by said one or more processors, cause: executing the command on two or more pluggable databases, including the first pluggable database:
aggregating results returned from the two or more pluggable databases before forwarding the result of executing the command to the database client.

20. The non-transitory computer-readable storage medium of claim 19, wherein: receiving the command to be executed on the first pluggable database includes a query coordinator process of the first database server receiving the command; and the sequences of instructions include instructions that, when executed by said one or more processors, cause said query coordinator process spawning two or more slave processes that are used to execute the command on the two or more pluggable databases in parallel.

* * * * *

UNITED STATES PATENT AND TRADEMARK OFFICE
CERTIFICATE OF CORRECTION

PATENT NO. : 10,360,269 B2
APPLICATION NO. : 15/331657
DATED : July 23, 2019
INVENTOR(S) : Baby Page 1 of 1

It is certified that error appears in the above-identified patent and that said Letters Patent is hereby corrected as shown below:

In the Drawings

On sheet 2 of 13, in FIG. 2, under Reference Numeral 203, Line 2, delete "Pluggabe" and insert -- Pluggable --, therefor.

In the Specification

In Column 6, Line 33, after "15/331,525," insert -- filed --.

In Column 6, Lines 33-34, after "et al." delete ", filed concurrently with the present application".

In the Claims

In Column 35, Line 34, in Claim 10, before "receiving" delete "which".

In Column 35, Line 41, in Claim 11, delete "client" and insert -- client, --, therefor.

In Column 36, Line 22, in Claim 14, delete "processors" and insert -- processors, --, therefor.

In Column 36, Line 27, in Claim 15, delete "wherein" and insert -- wherein: --, therefor.

In Column 36, Line 30, in Claim 15, delete "instruction" and insert -- instructions --, therefor.

In Column 36, Line 47, in Claim 18, delete "wherein" and insert -- wherein: --, therefor.

In Column 36, Line 51, in Claim 18, delete "processors" and insert -- processors, --, therefor.

In Column 36, Line 61, in Claim 19, delete "instruction" and insert -- instructions --, therefor.

In Column 36, Line 64, in Claim 19, delete "database:" and insert -- database; --, therefor.

Signed and Sealed this
Eleventh Day of August, 2020

Andrei Iancu
*Director of the United States Patent and Trademark Office*